(12) United States Patent  
Nagaoka

(10) Patent No.: US 6,519,098 B2
(45) Date of Patent: Feb. 11, 2003

(54) OBJECTIVE LENS SYSTEM

(75) Inventor: Toshiyuki Nagaoka, Akishima (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/845,205

(22) Filed: May 1, 2001

(65) Prior Publication Data

US 2001/0040211 A1 Nov. 15, 2001

Related U.S. Application Data

(62) Division of application No. 09/455,362, filed on Dec. 6, 1999, now Pat. No. 6,243,217, which is a division of application No. 08/713,069, filed on Sep. 12, 1996, now Pat. No. 5,999,327.

(30) Foreign Application Priority Data

Sep. 12, 1995 (JP) .............................................. 7-258220

(51) Int. Cl.[7] ................................................. G02B 9/04
(52) U.S. Cl. ...................... 359/793; 359/661; 348/552
(58) Field of Search .......................... 359/793, 784, 359/558, 656–661; 348/552; 345/168–169

(56) References Cited

U.S. PATENT DOCUMENTS

| 4,784,478 A | 11/1988 | Takada | 359/654 |
| 5,268,791 A | 12/1993 | Tsuchida | 359/654 |
| 5,353,133 A | 10/1994 | Bernkopf | 349/5 |
| 5,359,456 A | 10/1994 | Kikuchi | 359/654 |
| 5,377,047 A | 12/1994 | Broome et al. | 359/654 |
| 5,541,775 A | 7/1996 | Kiriki | 359/654 |
| 5,631,779 A | * 5/1997 | Kashima | 359/742 |
| 5,680,259 A | 10/1997 | Yamada | 359/753 |
| 5,729,389 A | 3/1998 | Nagaoka | 359/654 |

FOREIGN PATENT DOCUMENTS

| JP | 52-29238 | 4/1977 |
| JP | 57-64207 | 4/1982 |
| JP | 5-107471 | 4/1983 |

* cited by examiner

*Primary Examiner*—Jordan M. Schwartz
(74) *Attorney, Agent, or Firm*—Pillsbury Winthrop LLP

(57) ABSTRACT

A portable TV telephone has an objective lens system configured to form an image of an object and an antenna configured to transmit and receive at least one of an image signal representing the image of the object, a dial signal and a voice signal carried by radio waves. A display unit is configured to display at least a dial number and the image of the object and a switch is configured to operate responsive to at least the dial number. The objective lens system includes a diffractive optical element configured to at least correct chromatic aberration produced by the objective lens system. The objective lens system includes, in order from an object side, a first negative lens unit and a second positive lens unit.

6 Claims, 16 Drawing Sheets

OBJECTIVE LENS SYSTEM

This is a division of application Ser. No. 09/455,362 filed Dec. 6, 1999, now U.S. Pat. No. 6,243,217, which is a divisional of application Ser. No. 08/713,069 filed Sep. 12, 1996, now U.S. Pat. No. 5,999,327, the entire contents of each being incorporated by reference.

BACKGROUND OF THE INVENTION a) Field of the Invention

The present invention relates to an objective lens system which uses a radial type gradient index lens element.

b) Description of the Prior Art

As conventional examples of lens systems having relatively wide field angle and high optical performance which are used, for example, as objective lens systems for endoscopes, there are known many lens systems such as a lens system disclosed by Japanese Patent Kokoku Publication No. Sho 60-46410 shown in FIG. 1. A conventional example shown in FIG. 1 is a lens system of the so-called retrofocus type which is composed, in order from the object side, of a front lens unit having negative refractive power, a stop and a rear lens unit having a positive refractive power. In this lens system, the front lens unit has a function to widen a field angle and another function to correct curvature of field by reducing a Petzval's sum of the lens system as a whole, the rear lens unit serves for suppressing production of spherical aberration and coma by distributing refractive powers among three positive lens elements and a cemented lens component, and the cemented lens component corrects lateral chromatic aberration which poses a problem, in particular, in a lens system which has a wide field angle. Though this conventional example favorably corrects aberrations, it is composed of lens elements in a number as large as six, thereby posing a problem of low producibility or a high manufacturing cost. Accordingly, it is expected to develop a retrofocus type objective lens system for endoscopes which is composed of an extremely small number of lens elements and has a high producibility. However, a lens system which favorably corrects aberrations and has high optical performance can hardly be composed of two homogenous spherical lens elements.

Further, an endoscope is generally equipped with a system for illuminating a location to be observed since it is used frequently for observing and photographing dark locations such as interiors of human bodies, aircraft engines, pipings and so on. In addition, an objective lens system for endoscopes has an NA which is not so large for obtaining a large depth of field. Accordingly, axial aberrations do not pose a serious problem, but a wide field angle and a negative-positive asymmetrical composition as shown in FIG. 1 make it difficult to correct offaxial aberrations. When an objective lens system is to be composed of two negative and positive lens elements, it is impossible to use a cemented lens component as in the objective lens system disclosed by Japanese Patent Kokoku Publication No. Sho 60-46410 mentioned above as the conventional example, whereby lateral chromatic aberration can hardly be corrected and offaxial imaging performance is remarkably degraded. It is therefore difficult to favorably correct offaxial aberrations with two homogenous lens elements so as to obtain favorable offaxial imaging performance.

It is therefore conceivable to use a radial type gradient index lens element which is characterized in that it corrects chromatic aberration in particular more favorably than a homogenous lens element. As a conventional example of an objective lens system for endoscopes which uses a radial type gradient index lens element and is composed of two lens elements, there is known a lens system disclosed by Japanese Patent Kokai Publication No. Sho 52-29238. However, this conventional example has a field angle as narrow as 72° which is insufficient for use as an objective lens system for endoscopes.

Further, a lens system disclosed by Japanese Patent Kokai Publication No. Hei 5-107471, for example, is known as a conventional example of an objective lens system having a wide field angle obtained with two lens elements. Though this example uses a radial type gradient index lens element, it does not effectively make use of the chromatic aberration correcting capability of the radial type gradient index lens element and does not sufficiently correct lateral chromatic aberration which poses a problem in a lens system having a wide field angle in particular.

SUMMARY OF THE INVENTION

A primary object of the present invention is to provide an objective lens system which is composed of lens elements in a number on the order of 2, that favorably corrects aberrations and has a wide field angle.

The objective lens system according to the present invention is characterized in that it comprises, in order from the object side, a first lens unit having a negative refractive power and a second lens unit having a positive refractive power, that at least the first lens unit comprises a radial gradient index lens element which has a refractive index distribution in a radial direction of the lens element; and that the first lens unit satisfies that following condition (1):

$$1/V_{10} < 1/V_{00} \quad (1)$$

wherein the reference symbols $V_{00}$ and $V_{10}$ represent parameters expressing a dispersing power of the radial type gradient index lens element which are given by the following formula (b) and (c) respectively:

$$V_{00} = (N_{00d} - 1)/(N_{00F} - N_{00C}) \quad (b)$$

$$V_{10} = N_{10d}/(N_{10F} - N_{10C}) \quad (c)$$

wherein the reference symbols $N_{00d}$, $N_{00F}$, and $N_{00C}$ represent refractive indices of the radial type gradient index lens element for the d-line, F-line and C-line respectively, and the reference symbols $N_{10d}$, $N_{10F}$, and $N_{10C}$) designate values of a coefficient of a term $r^2$ for the d-line, F-line and C-line respectively when a refractive indices of the radial type gradient index lens element is expressed in a form of a poly-nominal. In embodiments of the present invention which are to be described later, refractive indices of radial type gradient index lens element are given by the following formula (a):

$$n(r) = N_{00} + N_{10}r^2 + N_{20}r^4 + \ldots \quad (a)$$

wherein the reference symbol r represent a distance as measured from an optical axis in a radial direction of the radial type gradient index lens element and the reference symbol n(r) designates a refractive index of a portion of the radial type gradient index lens element located at the distance r.

Further, the objective lens system according to the present invention is characterized in: that it is composed, in order from the object side, of a first lens unit having a negative refractive power, and a second lens unit having a positive refractive power, that at least the second lens unit comprises a radial type gradient index lens element having a refractive index distribution in a radial direction of the lens element, and that the second lens unit satisfies the following conditions (1) and (3):

$$1/V_{10} < 1V_{00} \quad (1)$$

$$0.05 < \phi_{2m}/\phi < 1.0 \quad (3)$$

wherein the reference symbols $\phi_{2m}$ represents a refractive index of a medium of the radial type gradient lens element used in the second lens unit.

Further, it is desirable that the objective lens system according to the present invention described above satisfies the following condition (2):

$$-0.5 < \phi_{1m}/\phi < -0.02 \quad (2)$$

wherein the reference symbol $\phi_{1m}$ represent a refractive power of a medium of the radial type gradient index lens element used in the first lens unit and the reference symbol $\phi$ designates a refractive power of the objective lens system as a whole.

DETAILED DESCRIPTION OF THE PREFERRED EMBODIMENTS

It is desirable that an objective lens system which has a relatively wide field angle for use in endoscopes, for example, is configured as the so-called retrofocus type composed, in order from the object side, of a first lens unit having a negative refractive power and a second lens unit having a positive refractive power.

Further, it is desirable that endoscopes, for example, which are inserted into human bodies and pipings for observing interiors thereof use objective lens systems having small diameters. When the lens system according to the present invention is to be used as an objective lens system for endoscopes, it is desirable for reducing a diameter of the lens system to compose it by disposing a stop between a negative lens unit and a positive lens unit. By selecting such a composition, it is possible to lower heights of rays passing through a first lens unit or a second lens unit, thereby reducing the diameter of the lens system. When the lens system has an asymmetrical composition, or is composed of a positive lens unit and a negative lens unit disposed on both sides of a top, however, offaxial aberrations are apt to be produced in large amounts in the lens system as a whole, or it is difficult to favorably correct lateral chromatic aberration in particular. For favorably correcting lateral chromatic aberration, it is desirable to use a radial type gradient index lens element which has a more excellent characteristic for correcting chromatic aberration than a homogenous lens element.

It is known that lateral chromatic aberration LTC produced by a thin radial type gradient index lens element is expressed by the following formula (d):

$$LTD = K(\phi_s/V_{00} + \phi_m/V_{10}) \quad (d)$$

wherein the reference symbol K represents a constant determined dependently on a height of an offaxial ray and an angle of a final axial ray, the reference symbol ($\phi_s$ designates a refractive power of a surface of the radial type gradient index lens element and the reference symbol ($\phi_m$ denotes a refractive power of a medium of the radial type gradient index lens element which is known to be approximated by the following formula (e):

$$\phi_m = 31 \ 2N_{10}d_G \quad (e)$$

wherein the reference symbol $d_G$ represents thickness of the radial type gradient index lens element.

As is apparent from the formula (d), it is possible to control an amount of chromatic aberration to a desired value by varying $V_{10}$ in the second term of the formula.

Figure 1:
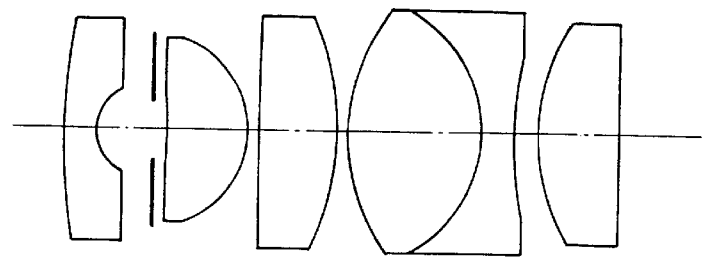
FIG. 1 shows a sectional view illustrating a composition of a conventional objective lens system.
Figure 2:
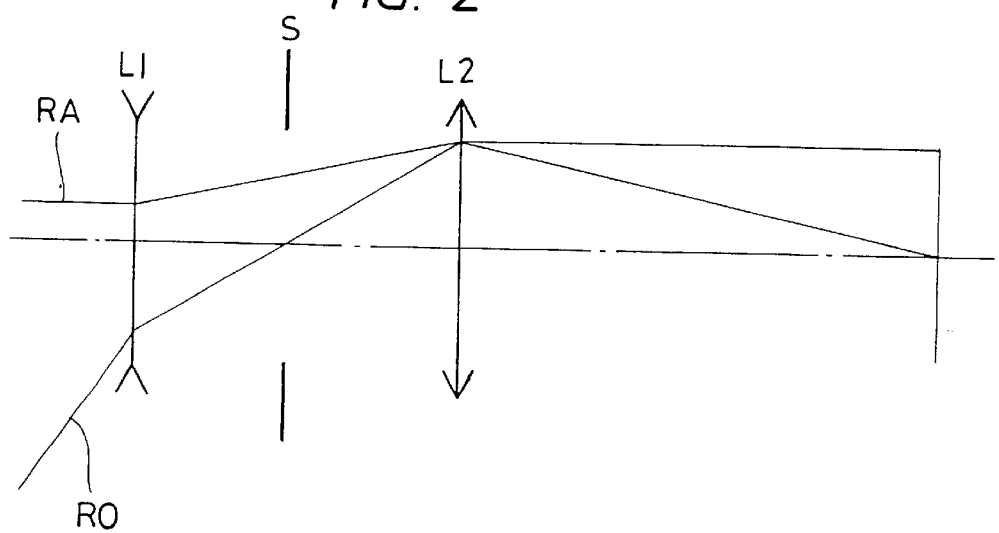
FIG. 2 shows a diagram schematically showing a fundamental composition of the objective lens system according to the present invention.

Since the objective lens system according to the present invention has an asymmetrical composition, like the model of thin lens elements shown in FIG. 2, wherein a first negative lens unit $L_1$ and a second positive lens unit $L_2$ are disposed in that order from the object side and on both side of a stop S, each of the lens units refracts a ray RO coming from an offaxial object point, unlike a ray RA coming from an axial object point, in a direction which is the same as a refracted direction (downward in FIG. 2) of an incident light bundle. Accordingly, lateral chromatic aberration is produced in a very large amount in the objective lens system according to the present invention, thereby making it difficult to compose the objective lens system, in order from the object side, of a negative lens unit and a positive lens unit which consist of two homogenous lens elements.

For solving this problem or favorably correcting lateral chromatic aberration by adopting a radial type gradient index lens element, it is conceivable to select either of two cases: one where the radial index lens element is used in the first negative lens unit and the other where the radial gradient lens element is used in the second positive lens unit.

Description will be made of a first composition of the objective lens system according to the present invention where a radial gradient index element is used in the first negative lens unit.

For allowing a radial type gradient index lens element to produce chromatic aberration in an amount smaller than that of chromatic aberration produced by a homogenous lens element which has the same refractive power as that of the radial type gradient index lens element, it is necessary to form the formula (d) to satisfy the following relationship:

$$\phi_s/V_{00} + \phi_m/V_{10} < \phi_1/V_{00}$$

wherein the reference symbol $\phi_t$ represents a refractive power of the homogenous lens element on an assumption that it has an Abbe's number which is equal to that on the optical axis of the radial type gradient index lens element.

Since the radial type gradient index lens element and the homogenous lens element which are compared with each other have the same refractive power, we obtain:

$$\phi_t = \phi_2 + \phi_m$$

From the two formulae mentioned above, there establishes the following relationship:

$$\phi_2/V_{00} + \phi_m/V_{10} < \phi_s/V_{00} + \phi_m/V_{00}$$

The above-mentioned condition (1) is obtained from this formula.

For favorably correcting lateral chromatic aberration in the objective lens system according to the present invention, it is desirable to use a radial type gradient index lens element satisfying the condition (1) as the first lens unit which has the negative refractive power as described above. The condition (1) is required for allowing a radial type gradient index lens element to produce chromatic aberration in an amount smaller than that of chromatic aberration produced by a homogenous lens element which has the same refractive power as that of the radial type gradient index lens element. If the condition (1) is not satisfied, a radial type gradient index lens element cannot correct lateral chromatic aberration more favorably than a homogenous lens element which has the same refractive power as that of the radial type gradient index lens element.

When a radial type gradient index lens element is to be used for correcting lateral chromatic aberration, it is necessary, as apparent from the formula (d), to take into sufficient consideration not only a value of $V_{10}$ but also refractive powers of a surface and a medium. For reducing an amount of lateral chromatic aberration to be produced by the first lens unit in the objective lens system according to the present invention, it is desirable from the formula (d) to meet the following equation:

$$\phi_s/V_{00} + \phi_m/V_{10} = 0$$

By using a total refractive power of a surface and a medium $\phi_G$ ($=\phi_s+\phi_m$) in this formula and developing it, we obtain:

$$\phi_m = \phi_G \times V_{10}/(V_{10}-V_{00})$$

Since the Abbe's number $V_{00}$ of a radial type gradient index lens element ordinarily has a value on the order of 30 to 80 on an optical axis and the first lens unit has the negative refractive power, the condition (1) required for correcting chromatic aberration can be transformed as follows:

$$\phi_G \times V_{10}/(V_{10}-V_{00}) < 0$$

It is desirable as understood from this formula that a medium has a negative refractive power. Taking into consideration this fact and the requirement to correct lateral chromatic aberration favorably in the objective lens system as a whole, it is desirable that a radial type gradient index lens element which is to be used in the objective optical system according to the present invention is made of a medium having a refractive power $\phi_{1m}$ satisfying the above-mentioned condition (2).

When a ratio of a refractive power of a medium of the first lens unit relative to a refractive power of the objective lens system satisfies the condition (2), it is possible to correct lateral chromatic aberration favorably in the objective lens system as a whole. If the upper limit of −0.02 of the condition (2) is exceeded, a medium of the radial type gradient index lens element will have a weak refractive power, thereby undesirably making it difficult to correct lateral chromatic aberration favorably in the objective lens system as a whole. If the lower limit of −0.5 of the condition (2) is not satisfied, in contrast, a medium will have too strong a refractive power, thereby overcorrecting lateral chromatic aberration.

The objective lens system according to the present invention which has a second composition is composed of a first lens unit having a negative refractive power and a second lens unit having a positive refractive power; a radial type gradient index lens element being used in the second lens unit having the positive refractive power; and the radial type gradient index lens element used in the second lens unit having a refractive index expressed by the above-mentioned formula (a) and satisfying the following conditions (1) and (3):

$$1/V_{10} < 1/V_{00} \qquad (1)$$

$$0.05 < \phi_{2m}/\phi < 1.0 \qquad (3)$$

wherein the reference symbol $\phi_{2m}$ represents a refractive power of the gradient index lens element which is used in the second lens unit and the reference symbol $\phi$ designates a refractive power of the objective lens system as a whole.

Since lateral chromatic aberration is produced in a very large amount in the objective lens system as a whole as described above, it is difficult to compose the lens system, in order from the object side, of two negative and positive homogenous lens elements. When a radial type gradient index lens element is to be used in the second lens unit for solving this problem or favorably correcting lateral chromatic aberration, it is desirable to configure this lens element so as to satisfy the condition (1) mentioned above.

The condition (1) is required for allowing the radial type gradient index lens element to produce chromatic aberration in an amount smaller than that of chromatic aberration produced by a homogenous lens element which has the same refractive power as that of the radial type gradient index lens element.

If the condition (1) is not satisfied, the radial type gradient index lens element cannot correct chromatic aberration more favorably than the homogenous lens element having the same refractive power as that of the radial type gradient index lens element.

When a radial type gradient index lens element is to be used for correcting lateral chromatic aberration, it is necessary to take into consideration not only a value of $V_{10}$ but also refractive powers of a surface and a medium as described above. When lateral chromatic aberration produced by the second lens unit is to be reduced in the objective lens system according to the present invention, the formula (d) is transformed, as in the case where a radial type gradient index lens element is used in the first lens unit, into the following formula:

$$\phi_m = \phi_G \times V_{10}/(V_{10} - V_{00})$$

Since the second lens unit has a positive refractive power, it is desirable that $\phi_m$ has a positive value. When a radial type gradient index lens element is to be used in the second lens unit for correcting lateral chromatic aberration favorably in the objective lens system as a whole, it is desirable that the refractive power $\phi_m$ of a medium satisfies the above-mentioned condition (3).

When a ratio of a refractive power of medium relative to a refractive power of the objective lens system as a whole satisfies the condition (3), it is possible to correct lateral chromatic aberration favorably in the objective lens system as a whole.

If the lower limit of 0.05 of the condition (3) is not satisfied, a medium of the radial type gradient index lens element will have a weak refractive power, thereby undesirably making it difficult to correct lateral chromatic aberration favorably in the objective lens system as a whole. If the upper limit of 1.0 of the condition (3) is exceeded, in contrast, a refractive power of medium will be too strong, thereby undesirably overcorrecting lateral chromatic aberration.

The condition (3) is required also for favorably correcting not only chromatic aberration but also the other aberrations.

The objective optical system according to the present invention which has a wide field angle produces a positive Petzval's sum in the lens system as a whole, thereby tending to tilt an image surface toward the object side. For favorably correcting this Petzval's sum, it is desirable to use a radial type gradient index lens element in the second lens unit which has a large positive Petzval's sum.

A Petzval's sum PTZ of a radial type gradient index lens element is expressed by the following formula (f):

$$PTZ = \phi_s/N_{00} + \phi_m/N_{00}^2 \tag{f}$$

As is apparent from the formula (f) in which the denominator of the second term on the right side is squared, it is possible to configure a radial type gradient index lens element so as to have a Petzval's sum which is smaller than of a homogenous lens element having the same refractive power as that of the radial type gradient index lens element.

For reducing a Petzval's sum of the objective lens system with a radial type gradient index lens element, it is desirable from the formula (f) that the radial type gradient index lens element satisfies the following formula:

$$\phi_s/N_{00} + \phi_m/N_{00}^2 = 0$$

The formula shown below can be derived by using a total refractive power of surface and medium $\phi_G$ ($=\phi_2+\phi_m$) in the above formula and developing it.

$$\phi_m = \phi_G \times N_{00}/(N_{00}-1)$$

Since refractive indices $N_{00}$ on an optical axis of radial gradient index lens elements ordinarily have values larger than 1, or on the order of 1.45 to 1.85, it is desirable for favorably correcting a Petzval's sum to use a radial type gradient index lens element which has a positive refractive power of medium when it is to be used in the second lens unit having the positive refractive power. If a radial type gradient index lens element which has a negative refractive power of medium is used in the second lens unit, the positive Petzval's sum will be further enlarged, hereby undesirably tilting an image surface toward the object side.

For correcting the Petzval's sum in the objective lens system according to the present invention, it is desirable from the formula (f) that a refractive power of medium is strong to a certain degree or refractive power of medium $\phi_m$ satisfies the condition (3). When a ratio of the refractive power of medium relative to a refractive power of the objective lens system as a whole satisfies the condition (3), it is possible to favorably correct the Petzval's sum in the objective lens system as a whole. If the lower limit of 0.05 of the condition (3) is not satisfied, a refractive power of medium will be weak, thereby making it difficult to correct the Petzval's sum favorably in the objective lens system as a whole. If the upper limit of 1.0 of the condition (3) is exceeded, in contrast, a refractive power of medium will be too strong and the Petzval's sum will be overcorrected, thereby undesirably tilting an image surface in a direction away from the object side.

As understood from the foregoing description, the condition (3) is required for favorably correcting lateral chromatic aberration and Petzval's sum at the same time in the objective lens system according to the present invention (which has the second composition).

Further, an objective lens system for endoscopes is generally used in combination with a solid-state image pickup device such as CCD or an end surface of the so-called image guide composed of an optical fiber bundle which is disposed on an image surface. When a objective lens system is to be combined not with a silver salt photographic film but with a solid-state image pickup device or an image guide, it is desirable for enhancing a light condensing efficiency to configure the objective lens system so as to be telecentric on the image side so that incident rays are as perpendicular as possible to an image surface. For configuring the objective lens system according to the present invention so as to meet this requirement, the second lens unit having the positive refractive power must have an image side surface which has a positive refractive power stronger than that of an object side surface thereof. When the image side surface of the second lens unit on which offaxial rays are relatively high has a strengthened refractive power in the objective lens system according to the present invention having a wide field angle, however, this surface will produce coma in a large amount and it will be difficult to correct this coma favorably with a homogenous lens element.

Accordingly, it was conceived to correct coma favorably in the objective lens system according to the present invention with a radial type gradient index lens element used in the second lens unit. For correcting this aberration, it is desirable that the radial type gradient index lens element has such a refractive index distribution as to progressively lower refractive indices from the optical axis toward a marginal portion. An amount of coma to be produced by the image side surface of the second lens unit can be reduced by configuring the radial type gradient index lens element to be used in the second lens unit so as to have such a refractive index distribution. Therefore, the condition (3) serves for favorable correction of coma in addition to favorable correction of lateral chromatic aberration. When the condition (3) is satisfied, the radial type gradient index lens element has a refractive index distribution wherein refractive indices are progressively lowered from the optical axis toward the marginal portion, thereby being capable of favorably correcting coma. If the lower limit of 0.05 of the condition (3) is not satisfied, it will be difficult to favorably correct coma with the radial type gradient index lens element. If the upper limit of 1.0 of the condition (3) is exceeded, in contrast, coma will undesirably be overcorrected.

Since the objective lens system according to the present invention has a wide field angle and the asymmetrical composition which is negative-positive in order from the object side, it tends to produce remarkable barrel form distortion which can hardly be corrected favorably with two homogenous lens elements. For correcting the barrel form distortion favorably in the objective lens system according to the present invention, it is desirable to use, in the second lens unit having the positive refractive power, a radial type gradient index lens element which has a refractive index distribution wherein refractive indices are progressively lowered from the optical axis toward the marginal portion. Distortion to be produced by the second lens unit can be reduced by using a radial type gradient index lens element having such a refractive index distribution. Accordingly, the condition (3) serves for favorable correction of distortion in addition to favorable correction of lateral chromatic aberration. When the condition (3) is satisfied, refractive indices are progressively lowered from the optical axis toward the marginal portion, thereby enabling to favorably correct distortion. If the lower limit of 0.05 of the condition (3) is not satisfied, it will be difficult to favorably correct distortion with a radial type gradient index lens element. If the upper limit of 1.0 of the condition (3) is exceeded, in contrast, aberrations other than distortion will undesirably be overcorrected.

The objective lens system according to the present invention which has a third composition is characterized in: that it is composed, in order from the object side, of a first lens unit having a negative refractive power and a second lens unit having a positive refractive power; that it uses at least one radial type gradient index lens element having a refractive index distribution in a radial direction from an optical axis which is expressed by the formula (a); and that at least one the of surfaces of lens elements including the radial type gradient index lens element composing the lens system is configured as an aspherical surface which has such a shape as to weaken a refractive power of the lens element having the aspherical surface from the optical axis toward the marginal portion.

Since the objective lens system according to the present invention has a wide field angle and an asymmetrical composition which is negative-positive in order from the object side, it tends to produce remarkable distortion in addition to lateral chromatic aberration. Though distortion can be corrected to a certain degree by using a radial type gradient index lens element in the second lens unit as described above, it is desirable for correcting distortion more favorably to configure the objective optical system according to the present invention so as to comprise at least one surface of at least one lens element which is configured as an aspherical surface having such a shape as to weaken a refractive power of the lens element having the aspherical surface from the optical axis toward the marginal portion. In the objective lens system according to the present invention, barrel form distortion is produced by both the first lens unit having the negative refractive power and the second lens unit having the positive refractive power. When an aspherical surface is to be used in either of the lens units in the objective lens system, it is therefore desirable to configure the aspherical surface so as to have such a shape as to weaken a refractive power from the optical axis toward the marginal portion of the lens element using the aspherical surface. When the second lens unit uses a radial type gradient index lens element, for example, it is desirable to use an aspherical surface in the first lens unit having the negative refractive power and configure the aspherical surface so as to have such a shape as to weaken the negative refractive power from the optical axis toward the marginal portion. Though distortion produced by the second lens unit can be corrected to a certain degree by using a radial type gradient index lens element in the second lens unit as described above, distortion can be corrected more favorably by using an aspherical surface in the first lens unit.

When a radial type gradient index lens element is used in the first lens unit, it is desirable to use, in the second lens unit having a positive refractive power, an aspherical surface which has such a shape as to weaken the positive refractive power toward the optical axis to a marginal portion.

If an aspherical surface has such a shape as to strengthen the refractive power of a lens unit which comprises this aspherical surface, it will undesirably make barrel form distortion more remarkable in the objective lens system as a whole.

It is needless to say that an effect similar to that described above can be obtained by configuring a surface of a radial type gradient index lens element as an aspherical surface.

For correcting lateral chromatic aberration in the objective lens system according to the present invention which has the third composition, it is desirable to configure the radial type gradient index lens element so as to satisfy the condition (1). If the condition (1) is not satisfied, lateral chromatic aberration will undesirably be more remarkable in the objective lens system according to the present invention.

It is needless to say that lateral chromatic aberration can be corrected more favorably by using two radial type gradient index lens elements when the objective lens system according to the present invention is to be composed of two negative and positive lens elements.

It is also needless to say that distortion can be corrected more favorably by using an aspherical surface on each of the lens elements when the objective lens system is to be composed of two negative and positive lens elements.

The objective lens system according to the present invention which has a fourth composition is characterized in that it is composed, in order from the object side, of a first lens unit having a negative refractive power and a second lens unit having a positive refractive power. The second lens unit comprises at least one radial type gradient index lens element which has a refractive index distribution in a radial direction expressed by the formula (a), or wherein refractive indices are progressively lowered from an optical axis toward a marginal portion. The radial type gradient index lens element has a shape of a positive lens element. The radial type gradient index lens element satisfies the condition (1).

When a radial type gradient index lens element is to be used in the second lens unit, it is desirable for correcting lateral chromatic aberration to configure it so as to satisfy the condition (1) as described above, and it is desirable for correcting a Petzval's sum, coma or distortion that this lens element has a refractive index distribution wherein refractive indices are lowered from the optical axis toward the marginal portion. When not only correction of aberrations but also manufacturing facility are taken into consideration, it is desirable that the radial type gradient index lens element has a shape of a positive lens element.

Since the objective lens system according to the present invention has a wide field angle, it is necessary that the second lens unit has a strong positive refractive power. When a radial type gradient index lens element is to be used in the second lens unit, it is therefore desirable that the radial type gradient index lens element also has a strongly positive refractive power. However, it is undesirable that the radial type gradient index lens element has an extremely strong positive refractive power of medium for a reason described below. As apparent from the formula (e), it is sufficient for strengthening a refractive power of medium of a radial type gradient index lens element to enlarge an absolute value of the refractive index distribution coefficient of the second order $N_{10}$ or thickness $d_G$ of the radial type gradient index lens element. However, an absolute value of the refractive index distribution coefficient of the second order can be enlarged only within a range limited by preparation of materials and enlargement of thickness $d_G$ makes it difficult to configure the objective lens system compactly, thereby making it unusable as an objective lens system for endoscopes, for example, which are desired to be compact. Accordingly, it is desirable not to impart an extremely strong positive refractive power to a medium but to impart refractive powers to both the medium and surfaces, or configure the radial type gradient index lens element so as to have a shape of a positive lens element.

The objective lens system according to the present invention which has a fifth composition is characterized in that it is composed, in order from the object side, of a first lens unit having a negative refractive power and a second lens unit having a positive refractive power; that it uses at least one lens element which is configured as a radial type gradient index lens element having a refractive index distribution in the radial direction from an optical axis expressed by the formula (a); and that a lens unit comprising the radial type gradient index lens element or at least one optical element disposed in the objective lens system has a function to shield components having specific wavelengths.

By using a radial type gradient index lens element, it is possible to obtain an objective lens system which favorably corrects chromatic aberration in particular and has high imaging performance. An objective lens system for endoscopes which comprises a solid-state image pickup device such as a CCD, for example, may use an infrared cut filter for cutting off rays in the infrared region since the image pickup device has high sensitivity at wavelengths in the infrared region. Further, such an optical system may use a low pass filter made, for example, of quartz for eliminating noise components produced due to moire. Furthermore, such an objective lens system may use a band cut filter for cutting off components having specific wavelengths since endoscopes may be used not only for observing interiors of human bodies but also for cutting off diseased portions of patients with laser knives. It is therefore desirable that the objective lens system according to the present invention uses not only a radial type gradient index lens element but also filters of the kinds mentioned above so that it can exhibit high imaging performance when it is used in optical systems for endoscopes which use, for example, solid-state image pickup devices such as CCD's.

It is desirable that these filters are disposed at locations between a lens element disposes on the image side and an image surface at which offaxial rays, in particular, are nearly in parallel with the optical axis. By disposing the filters as described above, it is possible to prepare approximately equal optical path lengths for axial and offaxial rays, thereby allowing the filters to exhibit their effects uniformly over the entire image pickup surface.

Endoscopes which are to be inserted into human bodies must be compact and require compacter optical systems. When importance is laid on compactness rather than optical performance, it is effective to dispose filters between the first lens unit and the second lens unit. Further, for obtaining an objective lens system which is compact and can be manufactured at a low cost, is is effective to impart filter functions to at least one of the lens elements including a radial type gradient index lens element.

The objective lens system according to the present invention which has a sixth embodiment is characterized in that it is composed, in order from the object side, of a first lens unit having a negative refractive power and a second lens unit having a positive refractive power, that it uses at least one radial type gradient index lens element which has a refractive index distribution in a radial direction expressed by the formula (a); and that it uses a reflecting surface for at least a single reflection disposed on the image side of the second lens unit.

Resolution of an optical system for endoscopes which uses a solid-state image pickup device such as a CCD, for example, can be enhanced by reducing the size of picture elements and arranging these picture elements in a larger number at a higher density on the image pickup device. However, the size of a picture element can be reduced only within a certain manufacturing limit and it is therefore conceivable to enhance resolution by enlarging an image pickup surface. However, it is desirable that endoscopes which may be inserted into human bodies have smaller diameters, or it is undesirable to enlarge image pickup surfaces, thereby enlarging diameters of endoscopes.

Figure 3:
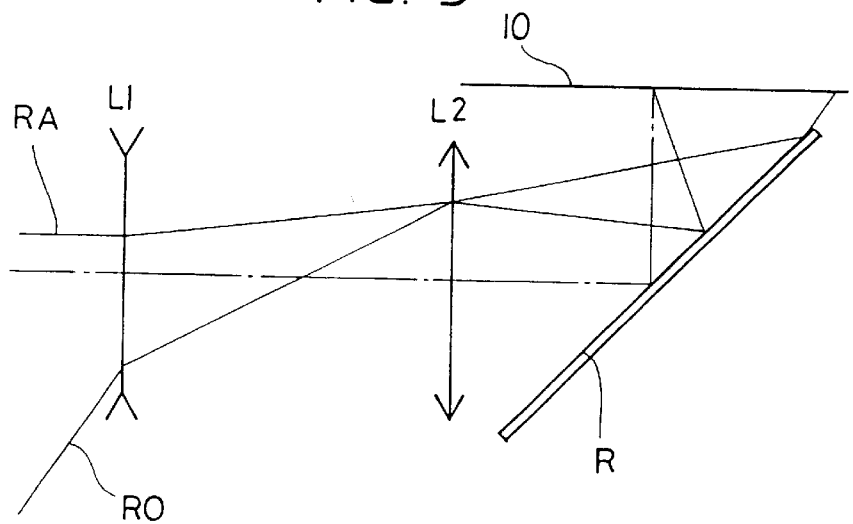
FIG. 3 shows a diagram schematically showing the fundamental composition of the objective lens system according to the present invention wherein an image surface is positioned in parallel with an optical axis.

For allowing solid-state image pickup devices having larger image pickup surfaces to be used without enlarging diameters of endoscopes, the objective lens system according to the present invention uses a reflecting surface for at least one reflection on the image side of the second lens unit which makes it possible to dispose a solid-state image pickup device not in parallel with a radial direction of the endoscope but in a position inclined with regard thereto. FIG. 3 shows a conceptional diagram of the objective lens system according to the present invention which has the sixth composition. In FIG. 3, the reference symbol $L_1$ represents the first negative lens unit, the reference symbol $L_2$ designates the second positive lens unit, the reference symbol RA denotes an axial ray, the reference symbol RO represents an offaxial ray, the reference symbol R designates the reflecting surface and the reference numeral 10 denotes the image pickup device disposed on an image pickup plane. The reflecting surface R disposed on the image side of the second lens unit makes it possible to arrange the solid-state image pickup device which has a large image pickup surface nearly parallel to the optical axis. Though a system for a single reflection is illustrated in FIG. 3, it is possible, needless to say, to obtain a similar effect by using a larger number of reflecting surfaces for a plurality of reflections.

When a solid-state image pickup device having a large image pickup surface is used, an image height can be enhanced in a lens system for obtaining a lens system having a wide field angle. However, it is desired for an objective lens system to correct aberrations more favorably over a range from a center to a marginal portion of an image plane.

For an objective lens system having a wide field angle in particular, it is desired to favorably correct lateral chromatic aberration.

An objective lens system which has high imaging performance for axial and offaxial rays can therefore be obtained by using a radial gradient index lens element which has high capability to correct chromatic aberration in particular. It is possible to obtain an objective lens system having higher performance by combining an objective lens system which uses a radial type gradient index lens element with a reflection system shown in FIG. 3 which permits enlarging an image pickup surface.

When a radial type gradient index lens element is used in the second lens unit in each of the compositions (first through sixth composition) of the objective lens system according to the present invention, it is desirable for more favorable correction of lateral chromatic aberration, coma and distortion to satisfy the following condition (4)

$$-0.5 < N_{10p} \cdot f^2 < -0.01 \quad (4)$$

wherein the reference symbol $N_{10p}$ represents a refractive index distribution coefficient of the second order when a radial type gradient index lens element is used in the second lens unit and the reference symbol f designates a focal length of the objective lens system as a whole.

When the condition (4) is satisfied, a refractive power of medium of the radial type gradient index lens element has a sufficiently large value, thereby making it possible to correct lateral chromatic aberration favorably. Further, refractive indices are progressively lowered from the optical axis toward a marginal portion and a difference in refractive index (Δn) is large between the optical axis and the marginal portion, thereby making it possible to favorably correct coma produced by an image side surface of the second lens unit and barrel form distortion which poses a problem in the objective lens system as a whole.

If the upper limit of −0.01 of the condition (4) is exceeded, the radial type gradient index lens element will have a weak refractive power of medium, thereby making it difficult to correct lateral chromatic aberration favorably in the objective lens system as a whole, and the difference in refractive indices will be small between the optical axis and the marginal portion, thereby making it difficult to correct coma and distortion. If the lower limit of −0.5 of the condition (4) is not satisfied, in contrast, the radial type gradient index lens element will have a large refractive index difference Δn, thereby undesirably making it difficult to prepare a material for the radial type gradient index lens element.

When a radial type gradient index lens element is used in the first lens unit in the objective lens system according to the present invention which has one of the compositions described above, it is desirable for correcting lateral chromatic aberration more favorably to satisfy the following condition (5):

$$0.01 < N_{10n} \cdot f^2 < 0.6 \quad (5)$$

wherein the reference symbol $N_{10n}$ represents the refractive index distribution coefficient of the second order of a gradient index lens element when the radial type gradient index lens element is used in the first lens unit and the reference symbol f designates a focal length of the objective lens system as a whole.

When the condition (5) is satisfied, a refractive power of medium of the radial type gradient index lens element has a sufficiently large value, thereby making it possible to correct lateral chromatic aberration favorably.

If the lower limit of 0.01 of the condition (5) is not satisfied, the radial type gradient index lens element will have a weak refractive power of medium, thereby making it difficult to correct lateral chromatic aberration favorably in the objective lens system as a whole. If the upper limit of 0.6 of the condition (5) is exceeded, the radial type gradient index lens element will have a large refractive index difference Δn, thereby making it difficult to prepare a material for the radial type gradient index lens element.

When the radial type gradient index lens element is used in the first lens unit or the second lens unit of the objective lens system according to the present invention, it is desirable for correcting lateral chromatic aberration more favorably in the lens system to satisfy the following condition (6):

$$1/V10 < 0.01 \quad (6)$$

The objective lens system which satisfies the condition (6) can favorably correct lateral chromatic aberration. Since radial type gradient index lens elements have Abbe's numbers on the order of 30 to 80 as described above, it is desirable from the formula (d), for allowing a radial type gradient index lens element to exhibit a sufficient function for correction chromatic aberration to satisfy the condition (6). If the condition (6) is not satisfied, it will undesirably be impossible to sufficiently correct lateral chromatic aberration.

When a radial type gradient index lens element is used in the first lens unit of the objective lens system according to the present invention which has any one of the first through sixth compositions, it is desirable for correcting lateral chromatic aberration more favorably to satisfy the following condition (7):

$$0.05 < d_{Gn}/f_{Gn} < 1.2 \quad (7)$$

wherein the reference symbol $d_{Gn}$ represents thickness of the radial type gradient index lens element used in the first lens unit and the reference symbol $f_{Gn}$ designates a focal length of the radial type gradient index lens element used in the first lens unit.

A radial type gradient index lens element can exhibit its effect to connect chromatic aberration when it has refractive power of medium $\phi_m$ having a value which is large to a certain degree as described above. When a radial type gradient index lens element has extremely small thickness, for example, the refractive power of medium $\phi_m$ is weak as judged from the formula (e), thereby making it difficult to favorably correct chromatic aberration. It is therefore desirable that the objective lens system according to the present invention satisfies the condition (7) when a radial type gradient index lens element is used in the first lens unit.

If the lower limit of 0.05 of the condition (7) is not satisfied, the refractive power of medium will be weak, thereby undesirably making it difficult to favorably correct lateral chromatic aberration. If the upper limit of 1.2 of the condition (7) is exceeded, in contrast, the radial type gradient index lens element will have large thickness, thereby undesirably prolonging a total length of the objective lens system.

When a radial type gradient index lens element is used in the second lens unit of the objective lens system according to the present invention which has any one of the composition described above, it is desirable for correcting lateral chromatic aberration more favorably to satisfy the following condition (8).

$$0.3 < d_{Gp}/f_{Gp} < 4.0 \tag{8}$$

wherein the reference symbol $d_{Gp}$ represents the thickness of the radial type gradient index lens element used in the second lens unit and the reference symbol $f_{Gp}$ designates a focal length of the radial type gradient index lens element used in the second lens unit.

When a radial type gradient index lens element has extremely small thickness as described above, for example, the refractive power of medium $\phi_m$ is weak, thereby making it difficult to correct chromatic aberration favorably. When a radial type gradient index lens element is to be used in the second lens unit of the objective lens system according to the present invention, the lens system is therefore configured so as to satisfy the condition (8).

If the lower limit of 0.3 of the condition (8) is exceeded, a refractive power of medium will be weak, thereby undesirably making it difficult to favorably correct lateral chromatic aberration. If the upper limit of 4.0 of the condition (8) is exceeded, a radial type gradient index lens element will have large thickness, thereby undesirably enlarging the objective lens system.

When the first lens unit is to be composed of a single negative lens element in the objective lens system according to the present invention which has any one of the compositions described above, it is desirable for favorably correcting aberrations to satisfy the following condition (9)

$$0.1 < 1H/r_2 < 1.7 \tag{9}$$

wherein the reference symbol 1H represents an image height and the reference symbol $r_2$ designates a radius of curvature on an image side surface of the first lens unit having the negative refractive power.

If the lower limit of 0.1 of the condition (9) is not satisfied, the image side surface of the first lens unit will have a weak refractive power and it will be necessary to strengthen a negative refractive power of an object side surface of the first lens unit on which off axial rays are relatively high, whereby the object side surface will undesirably produce distortion, astigmatism, etc. in larger amounts. If the upper limit of 1.7 of the condition (9) is exceeded, in contrast, the image side surface of the first lens unit will have a strong negative refractive power, thereby undesirably overcorrecting spherical aberration in the objective lens system as a whole.

When the second lens unit is to be composed of a single positive lens element in the objective lens system according to the present invention which has any one of the compositions described above, it is desirable for favorably correcting aberrations to satisfy the following condition (10)

$$-1.5 < IH/r_3 < 0.8 \tag{10}$$

wherein the reference symbol IH represents an image height and the reference symbol $r_3$ designates a radius of curvature on an object side surface of the second lens unit having the positive refractive power.

If the lower limit of −1.5 of the condition (10) is not satisfied, the object side surface of the second lens unit will have a strong negative refractive power, thereby undesirably overcorrecting spherical aberration in the objective lens system as a whole. If the upper limit of 0.8 of the condition (10) is exceeded, in contrast, the object side surface will undesirably produce spherical aberration, etc. in larger amounts.

When the, second lens unit is to be composed of a single positive lens element in the objective lens system according to the present invention which has any one of the compositions described above, it is desirable for favorably correcting aberrations to satisfy the following condition (11):

$$-1.0 < IH/r_4 < -0.2 \tag{11}$$

wherein the reference symbol IH represents an image height and the reference symbol $r_4$ designates a radius of curvature on an image side surface of the second lens unit having the positive refractive power.

If the lower limit of −1.0 of the condition (11) is not satisfied, the image side surface of the second lens unit will have a strong positive refractive power, thereby undesirably aggravating astigmatism and distortion in the objective lens system as a whole. If the upper limit of −0.1 of the condition (11) is exceeded, in contrast, it will be necessary to strengthen a positive refractive power of the object side surface of the second lens unit, whereby the object side surface will undesirably produce astigmatism and distortion in large amounts.

When a radial type gradient index element is to be used in the first lens unit in the objective lens system according to the present invention which has any one of the compositions described above, it is desirable for correcting lateral chromatic aberration more favorably to satisfy the following condition (12):

$$0.05 < N_{10n} \cdot f_{Gn}^2 < 1.2 \tag{12}$$

wherein the reference symbol $f_{Gn}$ represents a focal length of the radial type gradient index lens element to be used in the first lens unit.

When the condition (12) is satisfied, the refractive power of medium of the radial type gradient index lens element will have a value which is sufficiently large relative to its total refractive power and can favorably correct lateral chromatic aberration. If the lower limit of 0.05 of the condition (12) is not satisfied, the refractive power of medium will be weak, thereby undesirably making it difficult to correct lateral chromatic aberration favorably with the radial type gradient index lens element. IF the upper limit of 1.2 of the condition (12) is exceeded, refractive index difference Δn will be large, thereby undesirably making it difficult to prepare a material for the radial type gradient index lens element.

When a radial type gradient index lens element is to be used in the second lens element in the objective lens system according to the present invention which has any one of the compositions described above, it is desirable for correcting lateral chromatic aberration, a Petzval's sum, coma or distortion more favorably to satisfy the following condition (13):

$$-0.8 < N_{10p} \cdot f_{Gp}^2 < -0.05 \tag{13}$$

wherein the reference symbol $f_{Gp}$ d represents a focal length of the radial type gradient index lens element to be used in the second lens unit.

When the condition (13) is satisfied, the refractive power of medium of the radial type gradient index lens will have a value which is sufficiently large relative to its total refractive power and can favorably correct lateral chromatic aberration. If the upper limit of −0.05 of the condition (13) is exceeded, the refractive power of medium will be weak, thereby undesirably making it difficult to correct lateral chromatic aberration favorably with the radial type gradient index lens element. If the lower limit of −0.8 of the condition (13) is not satisfied, in contrast, refractive index difference Δn will be large, thereby undesirably making it difficult to prepare a material for the radial type gradient index lens element.

When a radial type gradient index lens element is to be used in the second lens unit in the objective lens system according to the present invention which has any one of the compositions described above, it is desirable, for facilitating preparation of a material in addition to correction of lateral chromatic aberration, to satisfy the following condition (14):

$$0.1 < \phi_{2m}/\phi < 0.8 \quad (14)$$

When the condition (14) is satisfied, the radial type gradient index lens element will have a strong refractive power of medium and can correct lateral chromatic aberration favorably. If the lower limit of 0.1 of the condition (14) is not reached, the radial type gradient index lens element will have a weak refractive power of medium and can hardly correct lateral chromatic aberration favorably in the objective lens system as a whole, and a difference in refractive indices will be small between a portion of the radial type gradient index lens element located on the optical axis and a marginal portion thereof, thereby making it difficult to correct coma and distortion. If the upper limit of 0.8 of the condition (14) is exceeded, in contrast, the radial type gradient index lens element will have a large refractive index difference Δn or large thickness, thereby undesirably making it difficult to prepare a material for the radial type gradient index lens element in the former case or undesirably enhancing a manufacturing cost and prolonging a total length of the objective lens system in the latter case.

When a radial type index lens element is to be used in the first lens unit in the objective lens system according to the present invention which has any one of the compositions described above, it is desirable, for facilitating manufacturing of the radial type gradient index lens element in addition to correction of lateral chromatic aberration, to satisfy the following condition (15):

$$-0.25 < \phi_{1m}/\phi < -0.05 \quad (15)$$

When the condition (15) is satisfied, the radial type gradient index lens element will have a strong refractive power of medium and can favorably correct lateral chromatic aberration. If the upper limit of −0.05 of the condition (15) is not reached, the radial type gradient index lens element will undesirably have a weak refractive power of medium and can hardly correct lateral chromatic aberration favorably. If the lower limit of −0.25 of the condition (15) is exceeded, the radial type gradient index lens element will undesirably have a large refractive index difference Δn, whereby it can hardly be manufactured or it will be thickner and more expensive to manufacture.

When a radial type gradient index lens element is to be used in the first lens unit in the objective lens system according to the present invention which has any one of the compositions described above, it is desirable, for facilitating manufacturing of the radial type gradient index lens element in addition to correction of lateral chromatic aberration, to satisfy the following condition (16)

$$0.02 < N_{10n} \cdot f^2 < 0.4 \quad (16)$$

When the condition (16) is satisfied, a marginal portion of the radial type gradient index lens element used in the first lens unit may have a refractive index higher than that of a portion thereof on the optical axis, whereby the radial type gradient index lens element has a sufficiently strong refractive power of medium and can correct lateral chromatic aberration favorably.

If the lower limit of 0.02 of the condition (16) is not satisfied, the radial type gradient index lens element will have a weak refractive power of medium, thereby making it difficult to correct lateral chromatic aberration favorably in the objective lens system as a whole. If the upper limit of 0.4 of the condition (16) is exceeded, the radial type gradient index lens element will have a large refractive index difference Δn, thereby undesirable making it difficult to prepare a material therefor.

When a radial type gradient index lens element is to be used in the second lens unit of the objective lens system according to the present invention which has any one of the compositions described above, it is desirable, for facilitating manufacturing of the radial type gradient index lens element in addition to correction of lateral chromatic aberration, to satisfy the following condition (17):

$$-0.25 < N_{10p} \cdot f2 < -0.04 \quad (17)$$

When the condition (17) is satisfied, the radial type gradient index lens element has a sufficiently strong refractive power of medium and can favorably correct lateral chromatic aberration.

If the upper limit of −0.04 of the condition (17) is exceeded, the radial type gradient index lens element will have a weak refractive power of medium, thereby making it difficult to correct lateral chromatic aberration favorably in the objective lens system as a whole. If the lower limit of −0.25 of the condition (17) is not satisfied, in contrast, the radial type gradient index lens element will have a large refractive index difference Δn, thereby making it difficult to prepare a material therefor.

For correcting lateral chromatic aberration more favorably in the objective lens system according to the present invention which has any one of the compositions described above, it is desirable to configure a radial type gradient index lens element so as to satisfy the following condition (18):

$$1/V_{10} < 0 \quad (18)$$

When the condition (18) is satisfied, the radial type gradient index lens element produces chromatic aberration in a direction opposite to that of chromatic aberration produced by a homogeneous lens element having a refractive power which is the same as that of the radial type gradient index lens element. That is to say, when a radial type gradient index lens element is used in the first lens unit or the second lens unit of the objective lens system according to the present invention satisfies the condition (18), lateral chromatic aberration is overcorrected independently by the radial type gradient index lens element, but this overcorrected chromatic aberration cancels lateral chromatic aberration produced by the other lens element, thereby correcting chromatic aberration favorably in the objective lens system as a whole.

When a radial type gradient index lens element is to be used in the first lens unit of the objective lens system according to the present invention which has any one of the compositions described above, it is desirable, for facilitating manufacturing of the radial type gradient index lens element in addition to correction of lateral chromatic aberration, to satisfy the following condition (19)

$$0.1 < d_{Gn}/f_{Gn} < 0.9 \quad (19)$$

If the lower limit of 0.1 of the condition (19) is exceeded, the radial type gradient index lens element will undesirably have a weak refractive power of medium, thereby undesirably making it difficult to correct lateral chromatic aberration favorably. If the upper limit of 0.9 of the condition (19) is exceeded, in contrast, the radial type gradient index lens element will be thick, thereby undesirably increasing the manufacturing cost of the objective lens system.

When a radial type gradient index lens element is to be used in the first lens unit of the objective lens system according to the present invention which has any one of the composition described above, it is desirable, for facilitating manufacturing of the radial type gradient index lens element in addition to correction of lateral chromatic aberration, to satisfy the following condition (20)

$$0.7 < d_{Gp}/f_{Gp} < 2.8 \quad (20)$$

When a radial type gradient index lens element has extremely small thickness for example, it has a weak refractive power of medium $\phi m$ and can hardly correct chromatic aberration favorably. When a radial type gradient index lens element is to be used in the second lens unit of the objective lens system according to the present invention, it is therefore desirable to configure the radial type gradient index lens element so as to satisfy the condition (20).

If the lower limit of 0.7 of the condition (20) is exceeded, the radial type gradient index lens element will undesirably have a weak refractive power of medium, thereby undesirably making it difficult to correct lateral chromatic aberration favorably. IF the upper limit of 2.8 of the condition (20) is exceeded, in contrast, the radial type gradient index lens element will have large thickness, thereby undesirably increasing the manufacturing cost of the objective lens system.

When the first lens unit is to be composed of a single negative lens element in the objective lens system according to the present invention which has any one of the compositions described above, it is desirable for more favorable correction of aberrations to configure it so as to satisfy the following condition (21):

$$0.25 < IH/r_2 < 1.4 \quad (21)$$

If the lower limit of 0.25 of the condition (21) is not satisfied, an image side surface of the first lens unit will have a weak negative refractive power and it will be necessary to strengthen a negative refractive power of an object side surface of the first lens unit on which off axial rays are relatively high, whereby the object side surface will undesirably produce distortion, astigmatism, etc. in large amounts. If the upper limit of 1.4 of the condition (21) is exceeded, in contrast, the image side surface of the first lens unit will have a strong negative refractive power, thereby undesirably overcorrecting spherical aberration in the objective lens system as a whole.

When the second lens unit is to be composed of a single positive lens element in the objective lens system according to the present invention which has any one of the compositions described above, it is desirable for favorably correcting aberrations to satisfy the following condition (22):

$$-0.9 < IH/r_3 < 0.6 \quad (22)$$

If the lower limit of $-0.9$ of the condition (22) is not reached, an object side surface of the second lens unit will have a strong negative refractive power, thereby undesirably overcorrecting spherical aberration in the objective lens system as a whole. IF the upper limit of 0.6 of the condition (22) is exceeded, in contrast, the object side surface will undesirably produce astigmatism, distortion, etc. in large amounts.

When the second lens unit is to be composed of a single positive lens element in the objective lens system according to the present invention which has any one of the compositions described above, it is desirable for favorable correction of aberrations to satisfy the following condition (23):

$$-0.8 < IH/r_4 < -0.2 \quad (23)$$

If the lower limit of $-0.8$ of the condition (23) is not reached, the image side surface of the second lens unit will have a strong negative refractive power, thereby undesirably aggravating astigmatism and distortion in the objective lens system as a whole. If the upper limit of $-0.2$ of the condition (23) is exceeded, in contrast, it will be necessary to strengthen the positive refractive power of the object side surface of the second lens unit, whereby the object side surface will undesirably produce spherical aberrations, etc. in large amounts.

When a radial type gradient index lens element is to be used as the first lens unit of the objective lens system according to the present invention which has any one of the compositions described above, it is desirable, for facilitating manufacturing of the radial type gradient index lens element in addition to correction of lateral chromatic aberration, to satisfy the following condition (24)

$$0.1 < 2 1 N_{10n} \cdot f_{Gn}^2 < 0.85 \quad (24)$$

When the condition (24) is satisfied, a refractive power of medium of the radial type gradient index lens element has a value sufficiently large relative to a total refractive power thereof, thereby making it possible to correct lateral chromatic aberration favorably. If the lower limit of 0.1 of the condition (24) is exceeded, the radial type gradient index lens element will undesirably have a weak refractive power of medium and can hardly correct lateral chromatic aberration favorably. If the upper limit of 0.85 of the condition (24) is not satisfied, in contrast, a refractive index difference $\Delta n$ will undesirably be large, thereby making it difficult to prepare a material for the radial type gradient index lens element.

When a radial type gradient index lens element is to be used as the second lens element of the objective lens system according to the present invention which has any one of the compositions described above, it is desirable, for facilitating manufacturing of the radial type gradient index lens element in addition to correction of lateral chromatic aberration, to satisfy the following condition (25):

$$-0.3 < N_{10p} \cdot f_{Gp}^2 < -0.1 \quad (25)$$

When the condition (25) is satisfied, a refractive power of medium of the radial type gradient index lens element has a value sufficiently large relative to a total refractive power thereof, whereby the radial type gradient index lens element can correct lateral chromatic aberration favorably. If the upper limit of −0.1 of the condition (25) is not reached, the refractive power of medium will undesirably be weakened, thereby undesirably making it difficult to correct lateral chromatic aberration with the radial type gradient index lens element. If the lower limit of −0.3 of the condition (25) is exceeded, in contrast, the refractive index difference Δn will undesirably be large, thereby making it difficult to prepare a material for the radial type gradient index lens element.

Though it is desirable to satisfy the condition (18) for correcting lateral chromatic aberration more favorably in the objective lens system according to the present invention which has any one of the compositions described above, lateral chromatic aberration is overcorrected when $1/V_{10}$ has a negative value which is too large. Therefore, it is further desirable to satisfy the following condition (26):

$$-0.5 < 1/V_{10} < 0 \quad (26)$$

When the condition (26) is satisfied, it is possible to correct lateral chromatic aberration favorably. If the upper limit of 0 of the condition (26) is exceeded, lateral chromatic aberration will undesirably be under-corrected. IF the lower limit of −0.5 of the condition (26) is not reached, lateral chromatic aberration will undesirably be over-corrected.

From a viewpoint of reducing a manufacturing cost of the objective lens system according to the present invention, it is desirable that a radial type gradient index lens element has a planar surface on one side or planar surfaces on both sides.

The objective lens system according to the present invention which has a seventh composition uses a diffraction type optical element as an optical element which is disposed in the lens system.

The objective lens system according to the present invention which has the seventh composition is composed, for example, of a first lens unit having a negative refractive power, a stop and a second lens unit having a positive refractive power: the first lens unit being composed of a diffractive optical element and the second lens unit being composed of a refractive optical element (lens).

Further, an objective lens system which can accomplish the object of the present invention can be obtained by composing a lens system of a positive lens unit and a positive lens unit: the positive lens unit disposed on the object side being composed of a radial type gradient index lens element and the lens unit disposed on the image side being composed of a diffractive optical element.

The objective lens system which has each of the compositions described above is composed of a small number of optical elements, has a compact size and exhibits favorable optical performance. It is therefore suited for use as an objective lens system for endoscopes, non-flexible endoscopes and video cameras.

Accordingly, endoscopes, non-flexible endoscopes, video cameras, portable TV telephones, portable data input units, etc. which use the objective lens system according to the present invention having the compositions described above are included within the scope of the present invention.

Now, embodiments of the objective lens system according to the present invention will be described below:

EMBODIMENT 1 focal length = 1.07 mm, object distance = 11.8 mm, image height = 0.97 mm, NA = 0.0115, 2ω = 113.1°

| | | | | |
|---|---|---|---|---|
| $r_1$ = | ∞ | $d_1$ = 0.3000 | $n_1$ = 1.48749 | $v_1$ = 70.21 |
| $r_2$ = | 1.2764 | $d_2$ = 1.2646 | | |
| $r_3$ = | ∞ (stop) | $d_3$ = 0.5196 | | |
| $r_4$ = | −11.2580 | $d_4$ = 1.8811 | n2 (radial type gradient index lens) | |
| $r_5$ = | 1.6678 | | | | radial type gradient index lens

| | $N_{00}$ | $N_{10}$ | $N_{20}$ | $N_{30}$ |
|---|---|---|---|---|
| d line | 1.72000, | $-0.87464 \times 10^{-1}$, | $0.44719 \times 10^{-2}$, | $0.37403 \times 10^{-2}$ |
| C line | 1.71540, | $-0.88776 \times 10^{-1}$, | $0.45390 \times 10^{2}$, | $0.37964 \times 10^{-2}$ |
| F line | 1.73072, | $-0.84403 \times 10^{-1}$, | $0.43154 \times 10^{-2}$,, | $0.36094 \times 10^{-2}$ |

$1/V_{10} = -0.050$, $1V_{00} = 0.021$, $\phi_{2m}/\phi = 0.353$, $N_{10p} \cdot f^2 = -0.100$, $IH/r_2 = 0.799$, $IH/r_3 = -0.091$ $IH/r_4 = -0.612$, $N_{10p} \cdot f_G^2 = -0.213$, $d_{Gp}/f_G = 1.207$

EMBODIMENT 2 focal length = 1.1 mm, object distance = 14 mm, image height = 0.85 mm, NA = 0.01, 2ω = 96.4°

| | | | | |
|---|---|---|---|---|
| $r_1$ = | ∞ | $d_1$ = 0.3000 | $n_1$ = 1.51633 | $v_1$ = 64.15 |
| $r_2$ = | 0.9785 | $d_2$ = 0.3992 | | |
| $r_3$ = | ∞ (stop) | $d_3$ = 0.1000 | | |
| $r_4$ = | −2.6225 | $d_4$ = 2.4188 | n2 (radial type gradient index lens) | |
| $r_5$ = | −1.8297 | | | | radial type gradient index lens

| | $N_{00}$ | $N_{10}$ | $N_{20}$ |
|---|---|---|---|
| d line | 1.88300, | −0.11306, | $0.10113 \times 10^{-2}$ |
| C line | 1.87656, | −0.11340, | $0.10143 \times 10^{-2}$ |
| F line | 1.89821, | −0.11227, | $0.10042 \times 10^{-2}$ |

$1/V_{10} = -0.010$, $1/V_{00} = 0.025$, $\phi_{2m}/\phi = 0.603$, $N_{10p} \cdot f^2 = -0.137$, $IH/r_2 = 0.869$, $IH/r_3 = -0.324$, $IH/r_4 = -0.465$, $N_{10p} \cdot f_G^2 = -0.192$, $d_{Gp}/f_G = 1.858$

EMBODIMENT 3 focal length = 1.1 mm, object distance = 11 mm, image height = 0.85 mm, NA = 0.01, 2ω = 103.5°

| | | | | |
|---|---|---|---|---|
| $r_1$ = | −5.5224 | $d_1$ = 0.3000 | $n_1$ = 1.51633 | $v_1$ = 64.15 |
| $r_2$ = | 1.2132 | $d_2$ = 0.7397 | | |
| $r_3$ = | ∞ (stop) | $d_3$ = 0.1000 | | |
| $r_4$ = | −4.0638 | $d_4$ = 2.8548 | n2 (radial type gradient index lens) | |
| $r_5$ = | −2.5042 | | | | radial type gradient index lens

| | $N_{00}$ | $N_{10}$ | $N_{20}$ |
|---|---|---|---|
| d line | 1.88300, | −0.10007, | $0.17880 \times 10^{-3}$ |
| C line | 1.87656, | $-0.99971 \times 10^{-1}$, | $0.17863 \times 10^{-3}$ |
| F line | 1.89821, | −0.10030, | $0.17922 \times 10^{-3}$ |

$1/V_{10} = 0.003$, $1/V_{00} = 0.025$, $\phi_{2m}/\phi = 0.627$, $N_{10p} \cdot f^2 = -0.120$, $IH/r_2 = 0.701$, $IH/r_3 = -0.209$, $IH/r_4 = -0.339$, $N_{10p} \cdot f_G^2 = -0.221$, $d_{Gp}/f_G = 1.922$

EMBODIMENT 4 focal length = 1.02 mm, object distance = 13 mm,
image height = 1.0 mm, NA = 0.012, 2ω = 99.1°

| | | | | |
|---|---|---|---|---|
| $r_1 =$ | ∞ | $d_1 = 0.3842$ | $n_1 = 1.74100$ | $\nu_1 = 52.65$ |
| $r_2 =$ | 1.4937 | (aspherical surface) | | |
| | | $d_2 = 1.0970$ | | |
| $r_3 =$ | ∞ (stop) | $d_3 = 0.8723$ | | |
| $r_4 =$ | 11.2798 | $d_4 = 1.6154$ | $n_2$ (radial type gradient index lens) | |
| $r_5 =$ | −1.7612 | | | | aspherical surface coefficients

P = 1,   $A_4 = -0.30311$,   $A_6 = 0.20982$ radial type gradient index lens

| | $N_{00}$ | $N_{10}$ | $N_{20}$ | $N_{30}$ |
|---|---|---|---|---|
| d line | 1.70000, | $-0.79349 \times 10^{-1}$, | $0.34621 \times 10^{-1}$, | $-0.10102 \times 10^{-1}$ |
| C line | 1.69580, | $-0.81730 \times 10^{-1}$, | $0.35660 \times 10^{-1}$, | $-0.10405 \times 10^{-1}$ |
| F line | 1.70960, | $-0.73795 \times 10^{-1}$, | $0.32198 \times 10^{-1}$, | $-0.93948 \times 10^{-2}$ |

$1/V_{10}=-0.100$, $1/V_{00}=0.020$, $\phi_{2m}/\phi=0.260$, $N_{10p} \cdot f^2=-0.082$, $IH/r_2=0.670$, $IH/r_3=0.089$, $IH/r_4=-0.568$, $N_{10p} \cdot f_G^2=-0.201$, $d_{Gp}/f_G=1.015$

EMBODIMENT 5 focal length = 1.1 mm, object distance = 14 mm,
image height = 0.85 mm, NA = 0.01, 2ω = 83.4°

| | | | | |
|---|---|---|---|---|
| $r_1 =$ | ∞ | $d_1 = 0.3000$ | $n_1 = 1.51633$ | $\nu_1 = 64.15$ |
| $r_2 =$ | 2.9790 | (aspherical surface) | | |
| | | $d_2 = 0.4409$ | | |
| $r_3 =$ | ∞ (stop) | $d_3 = 0.1000$ | | |
| $r_4 =$ | −1.1911 | $d_4 = 2.4102$ | $n_2$ (radial type gradient index lens) | |
| $r_5 =$ | −1.6277 | | | |

-continued aspherical surface coefficients

P = 1,   $A_4 = -0.55346$,   $A_6 = 0.76608$ radial type gradient index lens

| | $N_{00}$ | $N_{10}$ | $N_{20}$ |
|---|---|---|---|
| d line | 1.88300, | −0.12090, | $0.11838 \times 10^{-1}$ |
| C line | 1.87656, | −0.12126, | $0.11874 \times 10^{-1}$ |
| F line | 1.89821, | −0.12005, | $0.11755 \times 10^{-1}$ |

$1/V_{10}=-0.010$, $1/V_{00}=0.025$, $\phi_{2m}/\phi=0.641$, $N_{10p} \cdot f^2=-0.146$, $IH/r_2=0.336$, $IH/r_3=-0.840$, $IH/r_4=-0.614$, $N_{10p} \cdot f_G^2=-0.173$, $d_{Gp}/f_G=2.017$

EMBODIMENT 6 focal length = 1.37 mm, object distance = 14 mm,
image height = 0.85 mm, NA = 0.01, 2ω = 93.3°

| | | | | |
|---|---|---|---|---|
| $r_1 =$ | ∞ | $d_1 = 1.5026$ | $n_1$ (radial type gradient index lens) | |
| $r_2 =$ | 2.5886 | $d_2 = 0.8187$ | | |
| $r_3 =$ | ∞ (stop) | $d_3 = 0.1000$ | | |
| $r_4 =$ | 3.7062 | $d_4 = 2.1446$ | $n_2 = 1.88300$ | $\nu_2 = 40.78$ |
| $r_5 =$ | −1.5967 | | | | radial type gradient index lens

| | $N_{00}$ | $N_{10}$ | $N_{20}$ | $N_{30}$ |
|---|---|---|---|---|
| d line | 1.65000, | $0.21000 \times 10^{-1}$, | $0.20240 \times 10^{-1}$, | $0.14372 \times 10^{-1}$ |
| C line | 1.64443, | $0.21630 \times 10^{-1}$, | $0.20847 \times 10^{-1}$, | $0.14803 \times 10^{-1}$ |
| F line | 1.66300, | $0.19530 \times 10^{-1}$, | $0.18823 \times 10^{-1}$, | $0.13366 \times 10^{-1}$ |

$1/V_{10}$=-0.100, $1/V_{00}$=0.029, $\phi_{1m}/\phi$=-0.086, $N_{10n} \cdot f_2$=0.041, $IH/r_2$=0.328, $IH/r_3$=0.229, $IH/r_4$=-0.532, $N_{10n} \cdot f_G^2$=0.203, $d_{Gn}/f_G$=0.484

EMBODIMENT 7 focal length = 1.11 mm, object distance = 14 mm,
image height = 0.85 mm, NA = 0.01, 2ω = 104.8°

| | | | |
|---|---|---|---|
| $r_1$ = | ∞ | $d_1$ = 0.2945 | $n_1$ (radial type gradient index lens) |
| $r_2$ = | 1.0451 | $d_2$ = 0.8845 | |
| $r_3$ = | ∞ (stop) | $d_3$ = 0.1000 | |
| $r_4$ = | 2.6882 | $d_4$ = 2.0134 | $n_2$ = 1.88300  $\nu_2$ = 40.78 |
| $r_5$ = | -1.5483 | | | radial type gradient index lens

| | $N_{00}$ | $N_{10}$ | $N_{20}$ |
|---|---|---|---|
| d line | 1.51633, | 0.26303, | -0.10874 |
| C line | 1.51385, | 0.26382, | -0.10907 |
| F line | 1.52190, | 0.26119, | -0.10798 |

$1/V_{10}$=-0.010, $1/V_{00}$=0.016, $\phi_{1m}/\phi$=-0.171, $N_{10n} \cdot f^2$=0.322, $IH/r_2$=0.708, $IH/r_3$=0.244, $IH/r_4$=-0.586, $N_{10n} \cdot f_G^2$=0.609, $d_{Gn}/f_G$=0.194

EMBODIMENT 8 focal length = 1.13 mm, object distance = 20 mm,
image height = 0.8 mm, NA = 0.007, 2ω = 102.0°

| | | | |
|---|---|---|---|
| $r_1$ = | 5.5159 | $d_1$ = 0.3200 | $n_1$ (radial type gradient index lens) |
| $r_2$ = | 1.1306 | $d_2$ = 1.0270 | |
| $r_3$ = | ∞ (stop) | $d_3$ = 0.1000 | |
| $r_4$ = | 3.2778 | $d_4$ = 1.6805 | $n_2$ = 1.81600  $\nu_2$ = 46.62 |
| $r_5$ = | -1.3650 | | | radial type gradient index lens

| | $N_{00}$ | $N_{10}$ | $N_{20}$ |
|---|---|---|---|
| d line | 1.55000, | 0.21140, | 0.20293 |
| C line | 1.54633, | 0.21119, | 0.20273 |
| F line | 1.55856, | 0.21190, | 0.20340 |

$1/V_{10}$=0.003, $1/V_{00}$=0.022, $\phi_{1m}/\phi$=-0.153, $N_{10n} \cdot f^2$=0.269, $IH/r_2$=0.708, $IH/r_3$=0.244  $IH/r_4$=-0.586, $N_{10n} \cdot f_G^2$=0.787, $d_{Gn}/f_G$=0.166

EMBODIMENT 9 focal length = 1.11 mm, object distance = 14 mm,
image height = 0.9 mm, NA = 0.01, 2ω = 98.3°

| | | | | |
|---|---|---|---|---|
| $r_1$ = | ∞ | $d_1$ = 1.3941 | $n_1$ (radial type gradient index lens) | |
| $r_2$ = | 1.7035 | $d_2$ = 1.0045 | | |
| $r_3$ = | ∞ (stop) | $d_3$ = 0.1000 | | |
| $r_4$ = | 2.3343 | (aspherical surface) | | |
| | | $d_4$ = 2.7508 | $n_2$ = 1.72916 | $\nu_2$ = 54.68 |
| $r_5$ = | -1.3745 | (aspherical surface) | | | aspherical surface coefficients (4th surface)  P = 1,  $A_4$ = 0.60639 × $10^{-1}$,  $A_6$ = -0.86398
               $A_8$ = -0.85186

(5th surface)  P = 1,  $A_4$ = 0.33872 × $10^{-1}$,  $A_6$ = 0.71755 × $10^{-1}$,
               $A_8$ = -0.27664 × $10^{-1}$ radial type gradient index lens

| | $N_{00}$ | $N_{10}$ | $N_{20}$ | $N_{30}$ |
|---|---|---|---|---|
| d line | 1.70000, | 0.53850 × $10^{-1}$, | -0.25175 × $10^{-4}$, | -0.19807 × $10^{-2}$ |
| C line | 1.69300, | 0.55466 × $10^{-1}$, | -0.25931 × $10^{-4}$, | -0.20401 × $10^{-2}$ |
| F line | 1.71633, | 0.50081 × $10^{-1}$, | -0.23413 × $10^{-4}$, | -0.18420 × $10^{-2}$ |

$1/V_{10}=-0.100$, $1/V_{00}=0.033$, $\phi_{1m}/\phi=-0.167$, $N_{10n}\cdot f^2=0.066$, $IH/r_2=0.528$, $IH/r_3=0.386$, $IH/r_4=-0.655$, $N_{10n}\cdot f_G^2=0.155$, $d_{Gn}/f_G=0.822$

EMBODIMENT 10 focal length = 1.01 mm, object distance = 11.8 mm,
image height = 0.97 mm, NA = 0.0115, 2ω = 115.2°

| | | | |
|---|---|---|---|
| $r_1 =$ | ∞ | $d_1 = 0.4395$ | $n_1$ (radial type gradient index lens) |
| $r_2 =$ | 1.9633 | $d_2 = 1.1006$ | |
| $r_3 =$ | ∞ (stop) | $d_3 = 0.7310$ | |
| $r_4 =$ | 7.6592 | $d_4 = 2.0532$ | $n_2$ (radial type gradient index lens 2) |
| $r_4 =$ | −1.8838 | | | radial type gradient index lens 1

| | $N_{00}$ | $N_{10}$ | $N_{20}$ | $N_{30}$ |
|---|---|---|---|---|
| d line | 1.65000, | 0.19087, | −0.20292, | 0.10047 |
| C line | 1.64443, | 0.19468, | −0.20698, | 0.10248 |
| F line | 1.66300, | 0.18196, | −0.19345, | $0.95778 \times 10^{-1}$ | radial type gradient index lens 2

| | $N_{00}$ | $N_{10}$ | $N_{20}$ | $N_{30}$ |
|---|---|---|---|---|
| d line | 1.72000, | $-0.64751 \times 10^{-1}$, | $0.21345 \times 10^{-1}$, | $-0.39150 \times 10^{-2}$ |
| C line | 1.71568, | $-0.66046 \times 10^{-1}$, | $0.21772 \times 10^{-1}$, | $-0.39933 \times 10^{-2}$ |
| F line | 1.73008, | $-0.61729 \times 10^{-1}$, | $0.20349 \times 10^{-1}$, | $-0.37323 \times 10^{-2}$ |

1st lens $1/V_{10}=-0.067$, $1/V_{00}=0.029$, $\phi_{2m}/\phi=0.433$, $N_{10p}\cdot f^2=-0.066$, $IH/r_2=0.494$, $IH/r_3=0.127$, $IH/r_4=-0.515$, $N_{10p}\cdot f_G^2=-0.172$, $d_{Gp}/f_G=1.260$ 2st lens $1/V_{10}=-0.067$, $1/V_{00}=0.020$, $\phi_{1m}/\phi=-0.170$, $N_{10n}\cdot f^2=0.195$, $IH/r_2=0.494$, $IH/r_3=0.127$, $IH/r_4=-0.515$, $N_{10n}\cdot f_G^2=0.741$, $d_{Gn}/f_G=0.233$

EMBODIMENT 11 focal length = 1.48 mm, object distance = 11.6 mm,
image height = 1.54 mm, NA = 0.0082, 2ω = 140.3°

| | | | | |
|---|---|---|---|---|
| $r_1 =$ | ∞ | $d_1 = 0.3999$ | $n_1 = 1.65160$ | $v_1 = 58.52$ |
| $r_2 =$ | 1.3620 | $d_2 = 1.2404$ | | |
| $r_3 =$ | ∞ (stop) | $d_3 = 0.4587$ | | |
| $r_4 =$ | 27.7558 | $d_4 = 3.0744$ | $n_2$ (radial type gradient index lens) | |
| $r_5 =$ | −2.1899 | $d_5 = 0.5724$ | | |
| $r_6 =$ | ∞ | $d_6 = 0.4000$ | $n_3 = 1.51633$ | $v_3 = 64.15$ |
| $r_7 =$ | ∞ | $d_7 = 0.0300$ | | |
| $r_8 =$ | ∞ | $d_8 = 0.6200$ | $n_4 = 1.52000$ | $v_4 = 74.00$ |
| $r_9 =$ | ∞ | $d_9 = 0.0300$ | | |
| $r_{10} =$ | ∞ | $d_{10} = 0.4000$ | $n_5 = 1.51633$ | $v_5 = 64.15$ |
| $r_{11} =$ | ∞ | $d_{11} = 0.4800$ | | |
| $r_{12} =$ | ∞ | $d_{12} = 1.1000$ | $n_6 = 1.51633$ | $v_6 = 64.15$ |
| $r_{13} =$ | ∞ | $d_{13} = 1.0000$ | $n_7 = 1.51633$ | $v_7 = 64.15$ |
| $r_{14} =$ | ∞ | | | | radial type gradient index lens

| | $N_{00}$ | $N_{10}$ | $N_{20}$ | $N_{30}$ |
|---|---|---|---|---|
| d line | 1.63300, | $-0.37202 \times 10^{-1}$, | $0.26687 \times 10^{-2}$, | $0.94109 \times 10^{-3}$ |
| C line | 1.62841, | $-0.37680 \times 10^{-1}$, | $0.21318 \times 10^{-2}$, | $0.11022 \times 10^{-2}$ |
| F line | 1.64370, | $-0.36087 \times 10^{-1}$, | $0.39213 \times 10^{-2}$, | $0.56515 \times 10^{-3}$ |

$1/V_{10}=-0.043$, $1/V_{00}=0.024$, $\phi_{2m}/\phi=0.339$, $N_{10p}\cdot f^2=-0.082$, $IH/r_2=1.130$, $IH/r_3=0.055$, $IH/r_4=-0.703$, $N_{10p}\cdot f_G^2=-0.185$, $d_{Gp}/f_G=1.378$

EMBODIMENT 12 focal length = 0.83 mm, object distance = 9.3 mm,
image height = 0.8 mm, NA = 0.0115, 2ω = 128.9°

| | | | | | | | |
|---|---|---|---|---|---|---|---|
| $r_1 =$ | ∞ | $d_1 =$ | 0.3700 | $n_1 =$ | 1.51633 | $\nu_1 =$ | 64.15 |
| $r_2 =$ | 1.1462 | $d_2 =$ | 1.7257 | | | | |
| $r_3 =$ | ∞ (stop) | $d_3 =$ | 0.7547 | | | | |
| $r_4 =$ | 3.0329 | $d_4 =$ | 1.2159 | $n_2$ (radial type gradient index lens) | | | |
| $r_5 =$ | −1.5583 | $d_5 =$ | 0.0300 | | | | |
| $r_6 =$ | ∞ | $d_6 =$ | 0.4000 | $n_3 =$ | 1.52287 | $\nu_4 =$ | 59.89 |
| $r_7 =$ | ∞ | $d_7 =$ | 0.0300 | | | | |
| $r_8 =$ | ∞ | $d_8 =$ | 0.6200 | $n_4 =$ | 1.52000 | $\nu_4 =$ | 74.00 |
| $r_9 =$ | ∞ | $d_9 =$ | 0.0300 | | | | |
| $r_{10} =$ | ∞ | $d_{10} =$ | 0.4000 | $n_5 =$ | 1.51633 | $\nu_5 =$ | 64.15 |
| $r_{11} =$ | ∞ | $d_{11} =$ | 0.0300 | | | | |
| $r_{12} =$ | ∞ | $d_{12} =$ | 1.0000 | $n_6 =$ | 1.51633 | $\nu_6 =$ | 64.15 |
| $r_{13} =$ | ∞ | | | | | | | radial type gradient index lens

| | $N_{00}$ | $N_{10}$ | $N_{20}$ | $N_{30}$ |
|---|---|---|---|---|
| d line | 1.63300, | $-0.82149 \times 10^{-1}$, | $0.25774 \times 10^{-1}$, | $0.17638 \times 10^{-1}$ |
| C line | 1.62848, | $-0.82067 \times 10^{-1}$, | $0.25748 \times 10^{-1}$, | $0.17621 \times 10^{-1}$ |
| F line | 1.64377, | $-0.82341 \times 10^{-1}$, | $0.25834 \times 10^{-1}$, | $0.17679 \times 10^{-1}$ |
| g line | 1.65257, | $-0.82452 \times 10^{-1}$, | $0.25869 \times 10^{-1}$, | $0.17703 \times 10^{-1}$ |

$1/V_{10}=0.003$, $1/V_{00}=0.024$, $\phi_{2m}/\phi=0.166$, $N_{10p}\cdot f^2=-0.057$, $IH/r_2=0.698$, $IH/r_3=0.264$, $IH/r_4=-0.513$, $N_{10p}\cdot f_G^2=-0.166$, $d_{Gp}/f_G=0.855$

EMBODIMENT 13 focal length = 1.04 mm, object distance = 13 mm,
image height = 1.1 mm, NA = 0.01, 2ω = 140.5°

| | | | | | | | |
|---|---|---|---|---|---|---|---|
| $r_1 =$ | ∞ | $d_1 =$ | 0.3500 | $n_1 =$ | 1.51633 | $\nu_1 =$ | 64.15 |
| $r_2 =$ | 0.8824 | $d_2 =$ | 0.8722 | | | | |
| $r_3 =$ | ∞ (stop) | $d_3 =$ | 0.1000 | | | | |
| $r_4 =$ | ∞ | $d_4 =$ | 2.4666 | $n_2$ (radial type gradient index lens) | | | |
| $r_5 =$ | −1.6539 | | | | | | | radial type gradient index lens

| | $N_{00}$ | $N_{10}$ | $N_{20}$ |
|---|---|---|---|
| d line | 1.70000, | $-0.82964 \times 10^{-1}$, | $0.16995 \times 10^{-1}$ |
| C line | 1.69475, | $-0.84814 \times 10^{-1}$, | $0.17477 \times 10^{-1}$ |
| F line | 1.71225, | $-0.78645 \times 10^{-1}$, | $0.15871 \times 10^{-1}$ |

$1/V_{10}=-0.074$, $1/V_{00}=0.025$, $\phi_{2m}/\phi=0.426$, $N_{10p}\cdot f^2=-0.090$, $IH/r_2=1.245$, $IH/r_3=0.000$ $IH/r_4=-0.665$, $N_{10p}\cdot f_G^2=-0.183$, $d_{Gp}/f_G=1.661$

EMBODIMENT 14 focal length = 0.99 mm, object distance = 13 mm,
image height = 1.1 mm, NA = 0.01, 2ω = 108.9°

| | | | | | | | |
|---|---|---|---|---|---|---|---|
| $r_1 =$ | ∞ | $d_1 =$ | 0.3500 | $n_1 =$ | 1.53996 | $\nu_1 =$ | 59.57 |
| $r_2 =$ | 2.3039 | (aspherical surface) | | | | | |
| | | $d_2 =$ | 0.7372 | | | | |
| $r_3 =$ | ∞ (stop) | $d_3 =$ | 0.1000 | | | | |
| $r_4 =$ | −1.9109 | $d_4 =$ | 2.4559 | $n_2$ (radial type gradient index lens) | | | |
| $r_5 =$ | −1.5046 | | | | | | | aspherical surface coefficients

P = 1, $A_4 = -0.28151$, $A_6 = 0.21002$, $A_8 = -0.73150 \times 10^{-1}$ radial type gradient index lens

| | $N_{00}$ | $N_{10}$ | $N_{20}$ | $N_{30}$ |
|---|---|---|---|---|
| d line | 1.70000, | $-0.14024$, | $0.31859 \times 10^{-1}$, | $-0.54102 \times 10^{-2}$ |
| C line | 1.69475, | $-0.14257$, | $0.32390 \times 10^{-1}$, | $-0.55004 \times 10^{-2}$ |
| F line | 1.71225, | $-0.13478$, | $0.30620 \times 10^{-1}$, | $-0.51998 \times 10^{-2}$ |

$1/V_{10}=-0.056$, $1/V_{00}=0.025$, $\phi_{2m}/\phi=0.681$, $N_{10p}\cdot f^2=-0.137$, $IH/r_2=0.478$, $IH/r_3=-0.576$, $IH/r_4=-0.731$, $N_{10p}\cdot f_G^2=-0.198$, $d_{Gp}/f_G=2.066$

EMBODIMENT 15 focal length = 1.06 mm, object distance = 14 mm,
image height = 0.85 mm, NA = 0.01, 2ω = 98.5°

| | | | | | | | |
|---|---|---|---|---|---|---|---|
| r1 = | ∞ | $d_1 =$ | 0.3000 | $n_1 =$ | 1.51633 | $\nu_1 =$ | 64.15 |
| $r_2 =$ | 1.2020 | $d_2 =$ | 0.4079 | | | | |
| $r_3 =$ | ∞ (stop) | $d_3 =$ | 0.0500 | | | | |
| $r_4 =$ | ∞ | $d_4 =$ | 1.8037 | $n_2$ (radial type gradient index lens) | | | |
| $r_5 =$ | −1.1988 | $d_5 =$ | 0.2000 | | | | |
| $r_6 =$ | ∞ | $d_6 =$ | 2.0000 | $n_3 =$ | 1.51633 | $\nu_3 =$ | 64.15 |
| $r_7 =$ | ∞ | | | | | | |

-continued

| radial type gradient index lens | | | |
|---|---|---|---|
| | $N_{00}$ | $N_{10}$ | $N_{20}$ |
| d line | 1.75000, | -0.10566, | $0.60988 \times 10^{-1}$ |
| C line | 1.74500, | -0.10598, | $0.61170 \times 10^{-1}$ |
| F line | 1.76167, | -0.10492, | $0.60561 \times 10^{-1}$ |

$1/V_{10}=-0.01$, $1/V_{00}=0.022$, $\phi_{2m}/\phi=0.404$, $N_{10p} \cdot f^2=-0.119$, $IH/r_2=0.707$, $IH/r_3=0$ $IH/r_4=-0.709$, $N_{10p} \cdot f_G^2=-0.142$, $d_{Gp}/f_G=1.558$

EMBODIMENT 16 focal length = 0.87 mm, object distance = 11 mm,
image height = 0.8 mm, NA = 0.011, 2ω = 131.3°

| $r_1 =$ | ∞ | $d_1 = 0.3800$ | $n_1 = 1.88300$ | $\nu_1 = 40.78$ |
|---|---|---|---|---|
| $r_2 =$ | 0.7400 | $d_2 = 0.6000$ | | |
| $r_3 =$ | 1.6000 | $d_3 = 5.1250$ | $n_2$ (radial type gradient index lens) | |
| $r_4 =$ | ∞ | | | |

| radial type gradient index lens | | | | |
|---|---|---|---|---|
| | $N_{00}$ | $N_{10}$ | $N_{20}$ | $N_{30}$ |
| d line | 1.70000, | -0.12580, | $0.78000 \times 10^{-2}$, | $-0.47000 \times 10^{-3}$ |
| C line | 1.69475, | -0.12567, | $0.77985 \times 10^{-2}$, | $-0.47001 \times 10^{-3}$ |
| F line | 1.71225, | -0.12609, | $0.79935 \times 10^{-2}$, | $-0.48176 \times 10^{-3}$ |

$1/V_{10}=0.003$, $1/V_{00}=0.025$, $\phi_{2m}/\phi=0.499$, $N_{10p} \cdot f^2=-0.087$, $IH/r_2=1.081$, $IH/r_3=0.5$, $IH/r_4=0$, $N_{10p} \cdot f_G^2=-0.676$, $d_{Gp}/f_G=2.211$

EMBODIMENT 17 focal length = 0.84 mm, object distance = 11 mm,
image height = 0.8 mm, NA = 0.011, 2ω = 129.2°

| $r_1 =$ | ∞ | $d_1 = 0.3600$ | $n_1 = 1.88300$ | $\nu_1 = 40.78$ |
|---|---|---|---|---|
| $r_2 =$ | 0.6800 | $d_2 = 0.8000$ | | |
| $r_3 =$ | ∞ | $d_3 = 3.6000$ | $n_2$ (radial type gradient index lens) | |
| $r_4 =$ | ∞ | $d_4 = 2.8000$ | $n_3 = 1.51633$ | $\nu_3 = 64.15$ |
| $r_5 =$ | ∞ | | | |

| radial type gradient index lens | | | | |
|---|---|---|---|---|
| | $N_{00}$ | $N_{10}$ | $N_{20}$ | $N_{30}$ |
| d line | 1.70000, | -0.12580, | $0.78000 \times 10^{-2}$, | $-0.47000 \times 10^{-3}$ |
| C line | 1.69475, | -0.12567, | $0.77985 \times 10^{-2}$, | $-0.47001 \times 10^{-3}$ |
| F line | 1.71225, | -0.12609, | $0.79935 \times 10^{-2}$, | $-0.48176 \times 10^{-3}$ |

$1/V_{10}=0.003$, $1/V_{00}=0.025$, $\phi_{2m}/\phi=0.549$, $N_{10p} \cdot f^2=-0.090$, $IH/r_2=1.177$, $IH/r_3=0$, $IH/r_4=0$, $N_{10p} \cdot f_G^2=-0.298$, $d_{Gp}/f_G=2.471$

EMBODIMENT 18 focal length = 0.96 mm, object distance = 10 mm,
image height = 0.85 mm, NA = 0.01, 2ω = 108.5°

| $r_1 =$ | ∞ | $d_1 = 0.3500$ | $n_1 = 1.77250$ | $\nu_1 = 49.60$ |
|---|---|---|---|---|
| $r_2 =$ | 1.3385 | $d_2 = 0.3000$ | | |
| $r_3 =$ | ∞ | $d_3 = 2.0000$ | $n_2 = 1.51633$ | $\nu_2 = 64.15$ |
| $r_4 =$ | ∞ (stop) | $d_4 = 0.0500$ | | |
| $r_5 =$ | ∞ | $d_5 = 2.3091$ | $n_3$ (radial type gradient index lens) | |
| $r_6 =$ | -1.4778 | | | |

-continued

| radial type gradient index lens | | | |
|---|---|---|---|
| | $N_{00}$ | $N_{10}$ | $N_{20}$ |
| d line | 1.75000, | $-0.33160 \times 10^{-1}$, | $0.27722 \times 10^{-1}$ |
| C line | 1.74500, | $-0.33359 \times 10^{-1}$, | $0.27888 \times 10^{-1}$ |
| F line | 1.76167, | $-0.32696 \times 10^{-1}$, | $0.27334 \times 10^{-1}$ |

$1/V_{10}=-0.02$, $1/V_{00}=0.022$, $\phi_{2m}/\phi=0.147$, $N_{10p} \cdot f^2=-0.031$, $IH/r_2=0.717$, $IH/r_3=0$, $IH/r_4=-0.650$, $N_{10p} \cdot f_G^2=-0.091$, $d_{Gp}/f_G=1.397$

EMBODIMENT 19 f = 0.77, F/4.7, 2ω = 113.3°

| $r_1 =$ | ∞ | $d_1 = 0.3200$ | $n_1 = 1.51633$ | $\nu_1 = 64.15$ |
|---|---|---|---|---|
| $r_2 =$ | 0.4025 | $d_2 = 0.2229$ | | |
| $r_3 =$ | ∞ | $d_3 = 0.6556$ | $n_2 = 1.84666$ | $\nu_2 = 23.78$ |
| $r_4 =$ | -0.9538 | $d_4 = 0.1230$ | | |
| $r_5 =$ | ∞ (stop) | $d_5 = 0.6316$ | | |
| $r_6 =$ | 2.1852 | $d_6 = 0.8955$ | $n_3$ (radial type gradient index lens) | |
| $r_7 =$ | -3.2816 | $d_7 = 0.3800$ | | |
| $r_8 =$ | ∞ | $d_8 = 0.7500$ | $n_4 = 1.53172$ | $\nu_4 = 48.91$ |
| $r_9 =$ | ∞ | | | |

| radial type gradient index lens | | | | |
|---|---|---|---|---|
| | $N_{00}$ | $N_{10}$ | $N_{20}$ | $N_{30}$ |
| d line | 1.65000, | $-1.5405 \times 10^{-1}$, | $1.5784 \times 10^{-1}$, | $2.9179 \times 10^{-2}$ |
| C line | 1.64512, | $-1.5400 \times 10^{-1}$, | $1.5784 \times 10^{-1}$, | $2.9179 \times 10^{-2}$ |
| F line | 1.66138, | $-1.5418 \times 10^{-1}$, | $1.5784 \times 10^{-1}$, | $2.9179 \times 10^{-2}$ |
| g line | 1.67088, | $-1.5430 \times 10^{-1}$, | $1.5784 \times 10^{-1}$, | $2.9179 \times 10^{-2}$ |

EMBODIMENT 20 f = 0.65, F/4.25, 2ω = 113°

| $r_1 =$ | ∞ | $d_1 = 0.3200$ | $n_1 = 1.51633$ | $\nu_1 = 64.15$ |
|---|---|---|---|---|
| $r_2 =$ | 0.4397 | $d_2 = 0.1672$ | | |
| $r_3 =$ | ∞ | $d_3 = 0.7894$ | $n_2$ (radial type gradient index lens) | |
| $r_4 =$ | (stop) | $d_4 = 0.2910$ | | |
| $r_5 =$ | 2.1800 | $d_5 = 0.5912$ | $n_3 = 1.88300$ | $\nu_3 = 40.78$ |
| $r_6 =$ | -1.2158 | $d_6 = 0.3800$ | | |
| $r_7 =$ | ∞ | $d_7 = 0.7500$ | $n_4 = 1.53172$ | $\nu_4 = 48.91$ |
| $r_8 =$ | ∞ | | | |

| radial type gradient index lens | | | | |
|---|---|---|---|---|
| | $N_{00}$ | $N_{10}$ | $N_{20}$ | $N_{30}$ |
| d line | 1.65200, | $-5.4253 \times 10^{-1}$, | $6.6408 \times 10^{-1}$, | 1.0097 |
| C line | 1.64616, | $-5.3145 \times 10^{-1}$, | $6.5052 \times 10^{-1}$, | $9.8907 \times 10^{-1}$ |
| F line | 1.66562, | $-5.6836 \times 10^{-1}$, | $6.9570 \times 10^{-1}$, | 1.0578 |
| g line | 1.67733, | $-5.9247 \times 10^{-1}$, | $7.2632 \times 10^{-1}$, | 1.1002 |

EMBODIMENT 21 f = 2.74, F/2.8, 2ω = 68.1°

| $r_1 =$ | 3.0226 | $d_1 = 1.7507$ | $n_1$ (radial type gradient index lens) | |
|---|---|---|---|---|
| $r_2 =$ | 1.4700 | $d_2 = 1.6154$ | | |
| $r_3 =$ | ∞ (stop) | $d_3 = 1.1572$ | | |
| $r_4 =$ | 3.7806 | $d_4 = 2.4588$ | $n_2 = 1.69680$ | $\nu_2 = 55.53$ |
| $r_5 =$ | -2.2830 | (aspherical surface) | | |
| | | $d_5 = 0.7143$ | | |
| $r_6 =$ | ∞ | $d_6 = 0.7500$ | $n_3 = 1.48749$ | $\nu_3 = 70.21$ |
| $r_7 =$ | ∞ | | | |

-continued aspherical surface coefficients $P = 1,$  $A_4 = 3.1652 \times 10^{-2},$  $A_6 = 5.4023 \times 10^{-5},$
$A_8 = 5.2354 \times 10^{-4}$ radial type gradient index lens

| | $N_{00}$ | $N_{10}$ | $N_{20}$ |
|---|---|---|---|
| d line | 1.60000, | $-8.0063 \times 10^{-3},$ | $-2.4555 \times 10^{-3}$ |
| C line | 1.59400, | $-7.7381 \times 10^{-3},$ | $-2.3621 \times 10^{-3}$ |
| F line | 1.61400, | $-8.5860 \times 10^{-3},$ | $-2.6962 \times 10^{-3}$ |
| g line | 1.62646, | $-8.8951 \times 10^{-3},$ | $-2.9391 \times 10^{-3}$ |

EMBODIMENT 22

$f = 0.96,$  $F/4.25,$  $2\omega = 112.9°$

| | | | | |
|---|---|---|---|---|
| $r_1 =$ | $\infty$ | $d_1 = 0.3000$ | $n_1 = 1.51633$ | $\nu_1 = 64.15$ |
| $r_2 =$ | $\infty$ | $d_2 = 0.1500$ | | |
| $r_3 =$ | $-1.7433$ | $d_3 = 2.3691$ | $n_2$ (radial type gradient index lens) | |
| $r_4 =$ | $-0.9326$ | $d_4 = 0.3800$ | | |
| $r_5 =$ | $\infty$ | $d_5 = 0.7500$ | $n_3 = 1.53172$ | $\nu_3 = 48.91$ |
| $r_6 =$ | $\infty$ | | | | radial type gradient index lens

| | $N_{00}$ | $N_{10}$ | $N_{20}$ | $N_{30}$ |
|---|---|---|---|---|
| d line | 1.57000, | $-1.8143 \times 10^{-1},$ | $9.8792 \times 10^{-2},$ | $-1.8066 \times 10^{-1}$ |
| C line | 1.56715, | $-1.7983 \times 10^{-1},$ | $9.7920 \times 10^{-2},$ | $-1.7907 \times 10^{-1}$ |
| F line | 1.57665, | $-1.8517 \times 10^{-1},$ | $1.0083 \times 10^{-1},$ | $-1.8438 \times 10^{-1}$ |
| g line | 1.58176, | $-1.8795 \times 10^{-1},$ | $1.0115 \times 10^{-1},$ | $-1.8621 \times 10^{-1}$ |

EMBODIMENT 23

$f = 3.1,$  $F/2.8,$  $2\omega = 65.4°$

| | | | | |
|---|---|---|---|---|
| $r_1 =$ | $\infty$ (stop) | $d_1 = 0.1000$ | | |
| $r_2 =$ | $\infty$ | $d_2 = 4.6740$ | $n_1$ (radial type gradient index lens) | |
| $r_3 =$ | $-3.7203$ | $d_3 = 1.9817$ | | |
| $r_4 =$ | 7000.000 | $d_4 = 0.0010$ | $n_2 = 1000$ | $\nu_2 = -3.45$ (DOE) |
| $r_5 =$ | $\infty$ | $d_5 = 0.5000$ | $n_3 = 1.45851$ | $\nu_3 = 66.75$ |
| $r_6 =$ | $\infty$ | $d_6 = 0.7500$ | $n_4 = 1.53172$ | $\nu_4 = 48.91$ |
| $r_7 =$ | $\infty$ | | | | aspherical surface coefficients
(diffraction type optical element)

$P = 1,$  $A_4 = -2.1097 \times 10^{-5},$  $A_6 = 5.0147 \times 10^{-6},$
$A_8 = -3.0443 \times 10^{-7},$  $A_{10} = -1.3365 \times 10^{-8}$ radial type gradient index lens

| | $N_{00}$ | $N_{10}$ | $N_{20}$ | $N_{30}$ |
|---|---|---|---|---|
| d line | 1.70000, | $-1.4314 \times 10^{-2},$ | $-7.4587 \times 10^{-4},$ | $3.4977 \times 10^{-4}$ |
| C line | 1.69580, | $-1.4176 \times 10^{-2},$ | $-7.4587 \times 10^{-4},$ | $3.4977 \times 10^{-4}$ |
| F line | 1.70980, | $-1.4636 \times 10^{-2},$ | $-7.4587 \times 10^{-4},$ | $3.4977 \times 10^{-4}$ |
| g line | 1.71757, | $-1.4899 \times 10^{-2},$ | $-7.4587 \times 10^{-4},$ | $3.4977 \times 10^{-4}$ |

EMBODIMENT 24

$f = 3.4,$  $F/2.8,$  $2\omega = 60.4°$

| | | | | |
|---|---|---|---|---|
| $r_1 =$ | 3.9329 | $d_1 = 2.1359$ | $n_1 = 1.58423$ | $\nu_1 = 30.49$ |
| $r_2 =$ | 1.9115 | $d_2 = 0$ | $n_2 = 1000$ | $\nu_2 = -3.45$ (DOE) |
| $r_3 =$ | 1.9114 | $d_3 = 1.5050$ | | |
| $r_4 =$ | $\infty$ (stop) | $d_4 = 1.3716$ | | |
| $r_5 =$ | 4.6967 | $d_5 = 3.3378$ | $n_3 = 1.69680$ | $\nu_3 = 55.53$ |
| $r_6 =$ | $-2.9928$ | (aspherical surface) | | |
| | | $d_6 = 1.8296$ | | |
| $r_7 =$ | $\infty$ | $d_7 = 0.7500$ | $n_4 = 1.48749$ | $\nu_4 = 70.21$ |
| $r_8 =$ | $\infty$ | $d_8 = 1.2084$ | | |
| $r_9 =$ | $\infty$ (image) | | | | aspherical surface coefficients
(diffraction type optical element)

$P = 1,$  $A_4 = 9.1010 \times 10^{-6},$  $A_6 = -6.4422 \times 10^{-6},$
($6^{th}$ surface)

$P = 1,$  $A_4 = 1.1402 \times 10^{-2},$  $A_6 = -9.8667 \times 10^{-5},$
$A_8 = 1.5019 \times 10^{-5},$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 4:
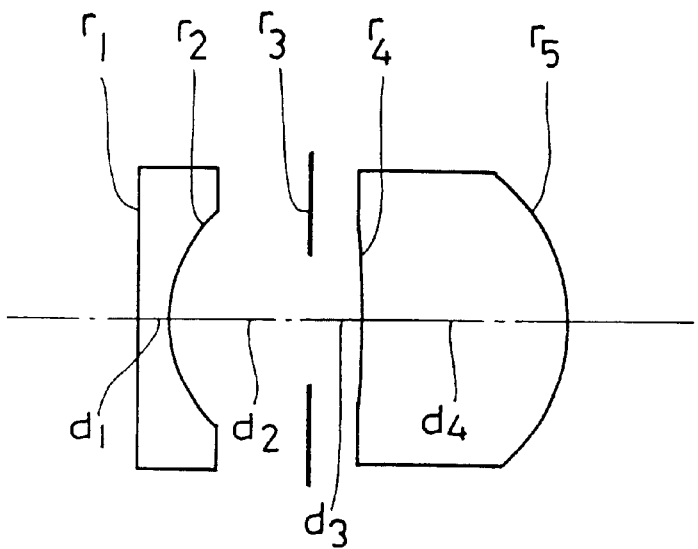
FIGS. 4 through 15 show sectional views illustrating compositions of first through twelfth embodiments of the objective lens system according to the present invention.

The first embodiment of the objective lens system according to the present invention has a composition illustrated in FIG. 4. Speaking concretely, it is composed of two lens units, i.e., in order from the object side, a first lens unit consisting of a negative lens element, a stop and a second lens unit consisting of a positive lens element. The second lens unit having the positive refractive power is configured as a radial type gradient index lens element. The first lens unit is composed of a homogenous lens element which has a planar surface on the object side and a concave surface on the image side, whereas the second lens unit is composed of a radial type gradient index lens element having a meniscus shape which has a concave surface on the object side.

Though it is ordinarily difficult to favorably correct lateral chromatic aberration in particular with two lens elements, the lens system preferred as the first embodiment is capable of favorably correcting lateral chromatic aberration by using the radial type gradient index lens element as the second lens unit.

Further, distortion and coma produced by the second lens unit are favorably corrected by the radial type gradient index lens element used as the second lens unit which has a refractive index distribution wherein refractive indices are progressively lowered from an optical axis toward a marginal portion.

In the first embodiment, lateral chromatic aberration in particular is corrected favorably by configuring the radial type gradient index lens element used as the second lens unit so as to satisfy the condition (18).

Furthermore, the object side planar surface of the first lens unit is effective for lowering a cost required for polishing the lens element.

Though the first embodiment is composed only of the two lens elements, it favorably corrects aberrations and has high optical performance.

Figure 5:
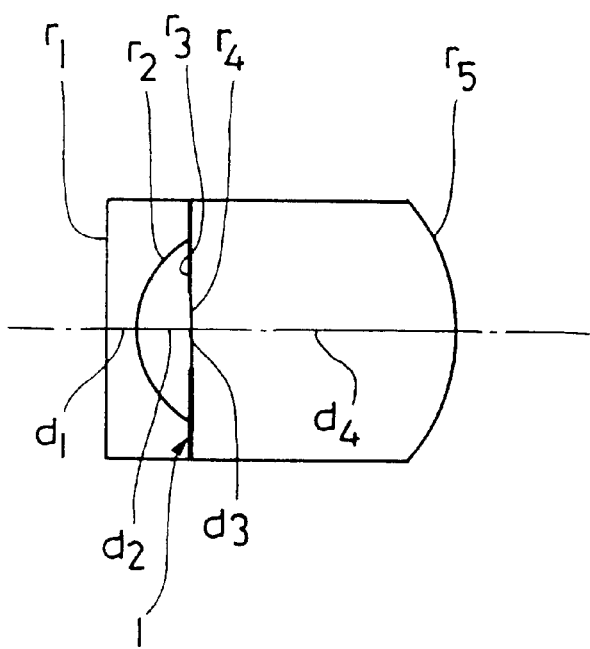

The second embodiment of the present invention is an objective lens system which has a composition illustrated in FIG. 5. Speaking concretely, it is composed of two lens elements, i.e., in order from the object side, a first lens unit composed of a negative lens element, a stop and a second lens unit composed of a positive lens element. The second lens unit having the positive refractive power is configured as a radial type gradient index lens element.

The second embodiment is an example in which the objective lens system is configured so as to have a total length that is shorter than that of the first embodiment. In the second embodiment also, lateral chromatic aberration in particular is favorably corrected by using the radial type gradient index lens element as the second lens unit.

The radial type gradient index lens element has a meniscus shape which has a concave surface on the object side. When a radial type gradient index lens element has such a meniscus shape, its refractive power of surface and refractive power of medium which are weaker and stronger respectively than a refractive power of surface and a refractive power of medium of a radial type gradient index lens element having a biconvex shape and a refractive power which is the same as that of the radial type gradient index lens element. When a radial type gradient index lens element has a strong refractive power of medium, its effect for correcting chromatic aberration can be effectively utilized as seen from the formula (d). For effectively utilizing the effect of a radial type gradient index lens element, the second embodiment adopts the radial type gradient index lens element which has the meniscus shape. The meniscus shape which has the concave surface on the object side is effective in particular for preventing offaxial aberrations from being aggravated.

In the second embodiment, the outer circumferential portion located outside an effective diameter of the first lens unit and the second lens unit is configured as a nearly planar surfaces on which both the lens units are cemented or kept in contact with each other. By cementing these two lens units into an integrated part, it is possible to simplify a structure of a lens barrel and facilitate assembly of the objective lens system.

The second embodiment also has high optical performance though it is composed only of the two lens elements.

Figure 6:
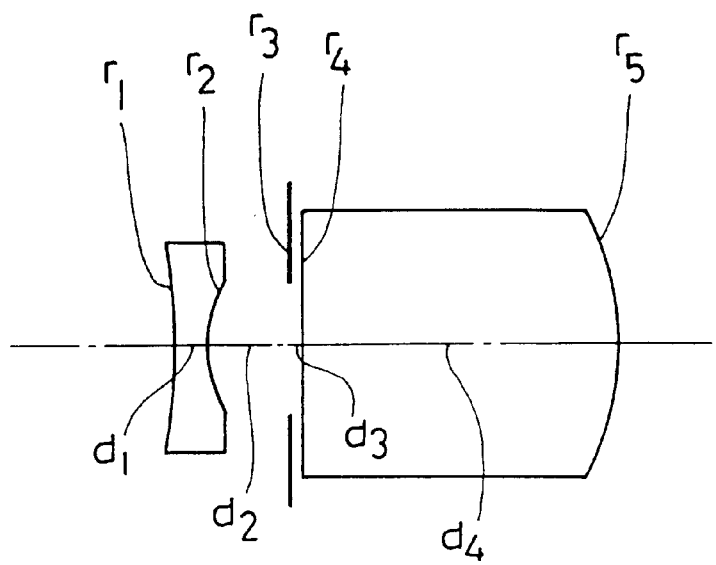

The third embodiment of the present invention is an objective lens system which has a composition illustrated in FIG. 6. That is to say, the objective lens system is composed of two lens unit, in order from the object side, of a first lens unit composed of a negative lens element, a stop, and a second lens unit composed of a positive lens element. The second lens unit having the positive refractive power is configured as a radial type gradient index lens element. The first lens unit is composed of a homogenous lens element having a biconcave shape, whereas the second lens unit is composed of a radial type gradient index lens element having a meniscus shape which has a concave surface on the object side.

Though it is ordinarily difficult to favorably correct lateral chromatic aberration with two lens elements, the objective lens system according to the present invention is capable of favorably correcting lateral chromatic aberration by using the radial type gradient index lens element as the second lens unit.

The third embodiment is an example wherein amounts of aberrations to be produced by the first lens unit are reduced by selecting the biconcave surface for the first lens unit so that a power of this lens unit is shared between the surfaces.

Though $1/V_{10}$ of the radial type gradient index lens element has a positive value, lateral chromatic aberration is favorably corrected by satisfying the condition (1).

The objective lens system preferred as the third embodiment also has high optical performance though it is composed only of the two lens elements.

Figure 7:
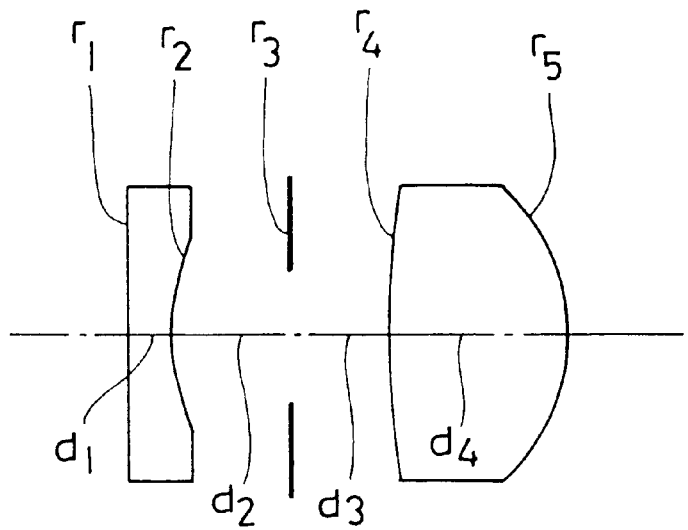

The fourth embodiment of the present invention is an objective lens system which has a composition shown in FIG. 7. Concretely, it is composed of two lens units, in order from the object side, a first lens unit composed of a negative lens element, a stop and a second lens unit composed of a positive lens element. The second lens unit having the positive refractive power is configured as a radial type gradient index lens element. The first lens unit has a planar surface on the object side and a concave surface on the image side configured as an aspherical surface which weakens a negative refractive power as portions of the aspherical surface are farther from an optical axis toward a marginal portion. The second lens unit is composed of a radial type gradient index lens element which has a biconvex shape.

The aspherical surface used in this embodiment has a shape expressed by the following formula:

wherein a direction along the optical axis is taken as the x axis, a direction perpendicular to the optical axis is taken as the y axis, the reference symbol r represents a radius of curvature on the optical axis, the reference symbol p designates a conical constant and the reference symbol $A_{2i}$ denotes an aspherical surface coefficient.

In the fourth embodiment, the aspherical surface used in the first lens unit is capable of favorably correcting mainly barrel form distortion produced in the lens system as a whole.

Though the first lens unit has the planar surface on the object side in the fourth embodiment, a similar effect can be obtained by using an aspherical surface as the object side surface of the first lens unit.

The fourth embodiment is an example wherein the second lens unit is configured as the biconvex radial type gradient index lens element which has a weakened refractive power of medium and a strengthened refractive power of surface. Accordingly, the radial type gradient index lens element can have a small refractive index difference $\Delta n$ contributing to a refractive power of medium, thereby enhancing productibility or shortening a time required for imparting a refractive index distribution at a stage to prepare a material for the radial type gradient index lens element.

In spite of the fact that the fourth embodiment is composed only of the two lens elements, it has high optical performance.

It is possible to obtain a similar effect by using, in place of the aspherical surface disposed in the first lens unit, an axial type gradient index lens element having a refractive index continuously varying in the direction along the optical axis.

Figure 8:
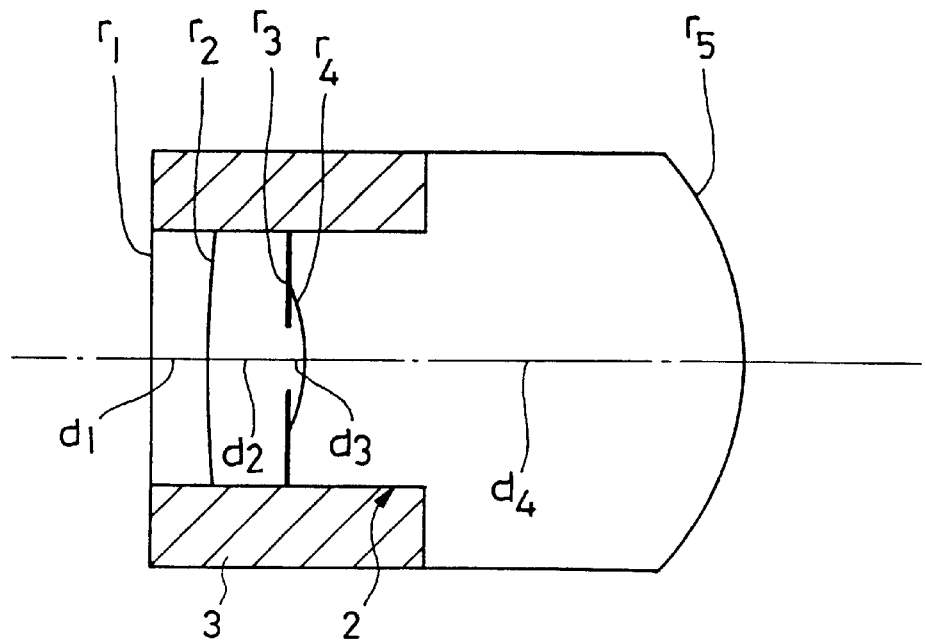

The fifth embodiment of the present invention is an objective lens system which has a composition illustrated in FIG. 8. That is to say, it is composed of two lens elements, in order from the object side, a first lens unit composed of a negative lens element, a stop and a second lens unit composed of a positive lens element configured as a radial type gradient index lens element. The first lens unit has a planar surface on the object side and a concave surface on the image side which is configured as an aspherical surface which has such a shape as to weaken a negative refractive power as portions of the aspherical surface are farther from the optical axis toward a marginal portion, whereas the second lens unit is configured as a radial type gradient index lens element having a biconvex shape. The aspherical surface used in the first lens unit is capable of favorably correcting barrel form distortion which is produced in the objective lens system as a whole as in the fourth embodiment.

For configuring compactly a tip of an endoscope which is to comprise the objective lens system according to the present invention, an outer circumferential portion of the radial type gradient index lens element used as the second lens unit is cut off as shown in FIG. 8. A tip of the objective lens system can be made thinner since the lens barrel or the like can be disposed, for example, as a slashed location 3 on the cut portion 2.

The fifth embodiment is an example wherein the objective lens system has a total length that is shorter than that of the fourth embodiment. Though the fifth embodiment is composed only of the two lens elements, it has high optical performance.

Figure 9:
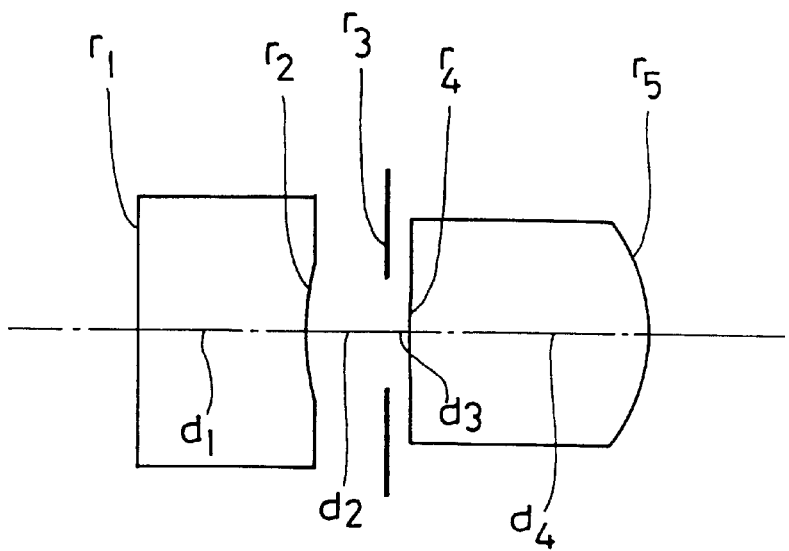

The sixth embodiment of the present invention has a composition shown in FIG. 9. Speaking concretely, it is composed of two lens units, in order from the object side, a first lens unit composed of a negative lens element, a stop and a second lens unit composed of a positive lens element. The first lens unit having the negative refractive power is configured as a radial type gradient index lens element. The first lens unit is a radial type gradient index lens element which has a planar surface on the object side and a concave surface on the image side, whereas the second lens unit is a biconvex homogenous lens element.

Unlike the first through fifth embodiments, the sixth embodiment uses the radial type gradient index lens element as the first lens unit for favorably correcting lateral chromatic aberration which poses a problem in particular in the objective lens system according to the present invention.

The planar surface adopted as the object side surface of the first lens unit makes it possible to reduce the cost required for polishing the lens element.

Further, aberrations are reduced by selecting the biconvex shape for the second lens unit so that its power is shared between the two surfaces.

Furthermore, the image side surface of the second lens unit has a refractive power of surface which is stronger than that of the object side surface thereof so that offaxial rays are incident on an image surface nearly at telecentric angles.

The sixth embodiment also has high optical performance though it is composed only of the two lens elements.

Figure 10:
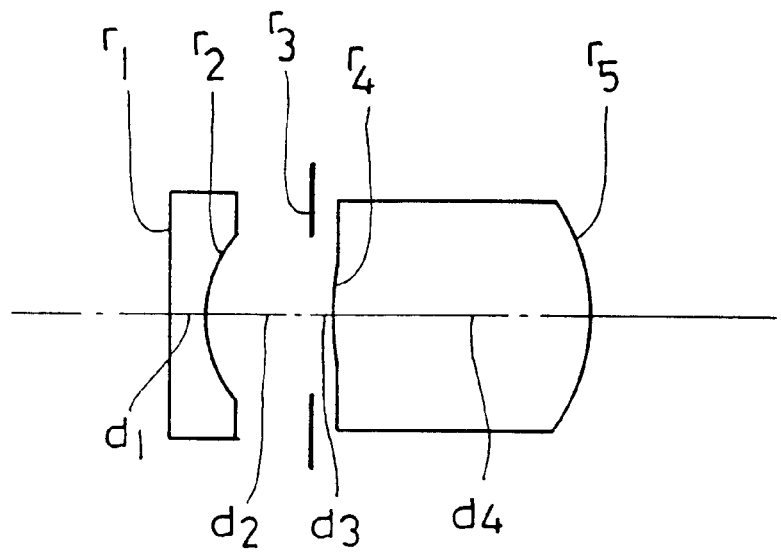

The seventh embodiment of the present invention has a composition illustrated in FIG. 10. That is to say, an objective lens system preferred as the seventh embodiment is composed of two lens units, in order from the object side, a first lens unit composed of a negative lens element, stop and a second lens unit composed of a positive lens element. The first lens unit having the positive refractive power is configured as a radial type gradient index lens element. The first lens unit is a radial type gradient index lens element which has a planar surface on the object side and a concave surface on the image side, whereas the second lens unit is a homogeneous lens element which has a biconvex shape.

This embodiment also has high optical performance though it is composed only of the two lens elements.

Figure 11:
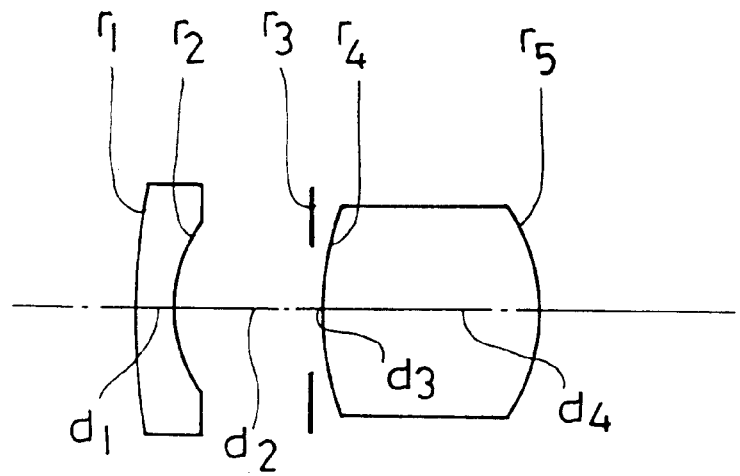

The eighth embodiment of the present invention is an objective lens system which has a composition shown in FIG. 11. This lens system is composed of two lens units, in order from the object side, a first lens unit composed of a negative lens element, a stop and a second lens unit composed of a positive lens element. The first lens unit having the positive refractive power is configured as a radial type gradient index lens element. The first lens unit is a radial type gradient index lens element having a meniscus shape which has a concave surface on the image side, whereas the second lens unit is a homogeneous lens element which has a biconvex shape.

The composition of the eighth embodiment, in which the radial type gradient index lens element has the meniscus shape which has a concave surface on the image side is advantageous for correcting offaxial aberrations in particular.

The eighth embodiment also has high optical performance in spite of the face that it is composed only of the two lens elements.

Figure 12:
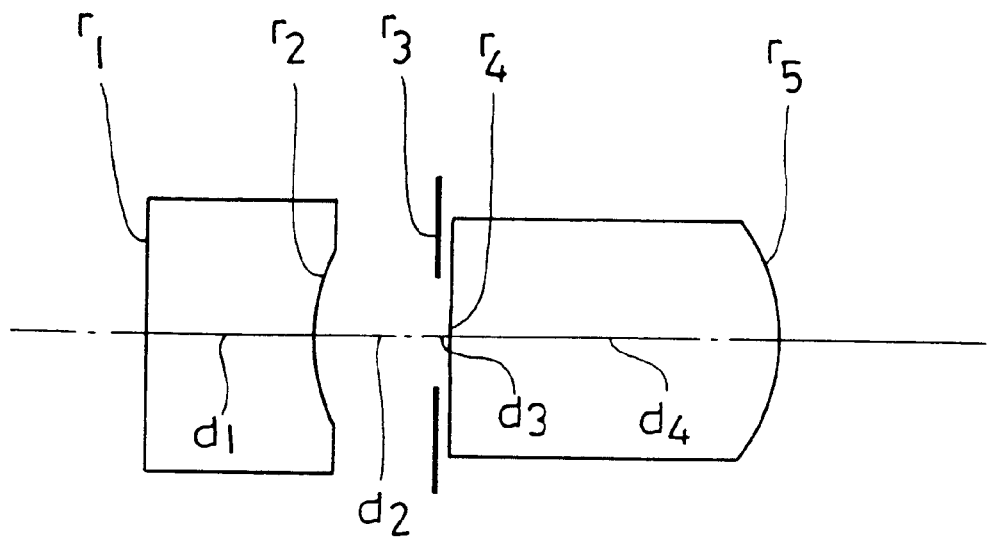

The ninth embodiments of the present invention is an objective lens system which has a composition illustrated in FIG. 12. Speaking concretely, this lens system is composed of two lens elements, in order from the object side, a first lens unit composed of a negative lens units, a stop and a second lens unit composed of a positive lens element. The first lens unit having the negative refractive power is configured as a radial type gradient index lens element. The first lens unit is a radial type gradient index lens element having a meniscus shape which has a planar surface on the object side and a concave surface on the image side, whereas the second lens unit has aspherical surfaces on both sides.

Owing to a fact that an image side surface of the second lens unit on which offaxial rays are relatively high is configured as an aspherical surface having such a shape as to weaken a positive refractive power as portions of the aspherical surface are farther from an optical axis toward a marginal portion, the ninth embodiment is capable of favorably correcting barrel form distortion produced in the lens system as a whole.

Though the ninth embodiment uses the aspherical surfaces on both sides of the second lens unit, a similar effect can be obtained by using an aspherical surface only on one side.

The ninth embodiment also exhibits high optical performance though it consists only of the two lens elements.

Further, a similar effect can be obtained by adopting, the place of the aspherical surfaces used in the second lens unit, an axial type gradient index lens element which continuously varies a refractive index in a direction along the optical axis.

Figure 13:
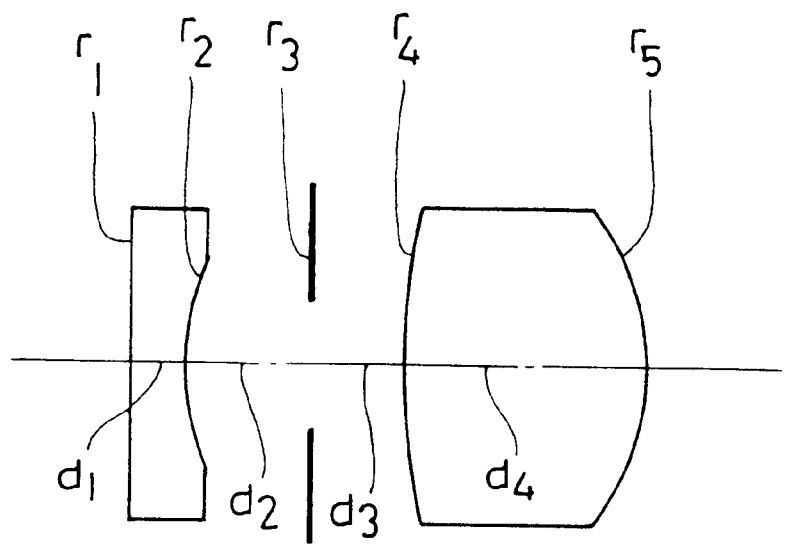

The tenth embodiment of the present invention is an objective lens system which has a composition shown in FIG. 13. This lens system consists of two lens units, in order from the object side, a first lens unit composed of negative lens element, a stop and a second lens unit composed of a positive lens element. The first lens unit having the negative refractive power and the second lens unit having the positive refractive power are configured as radial type gradient index lens elements. The first lens unit is a radial type gradient index lens element which has a planar surface on the object side and a concave surface on the image side, whereas the second lens unit is a radial type gradient index lens element which has a biconvex shape.

The tenth embodiment is an example wherein lateral chromatic aberration produced in the lens system as a whole is favorably corrected by using radial type gradient index lens elements in both the lens units. In other words, lateral chromatic aberration is favorably corrected by configuring the radial type gradient index lens element used in the first lens unit to satisfy the condition (1) and the condition (2), and designing the radial type gradient index lens element used in the second embodiment to satisfy the condition (1) and the condition (3).

Though the tenth embodiment consists only of the two lens elements, it has high optical performance.

Figure 14:
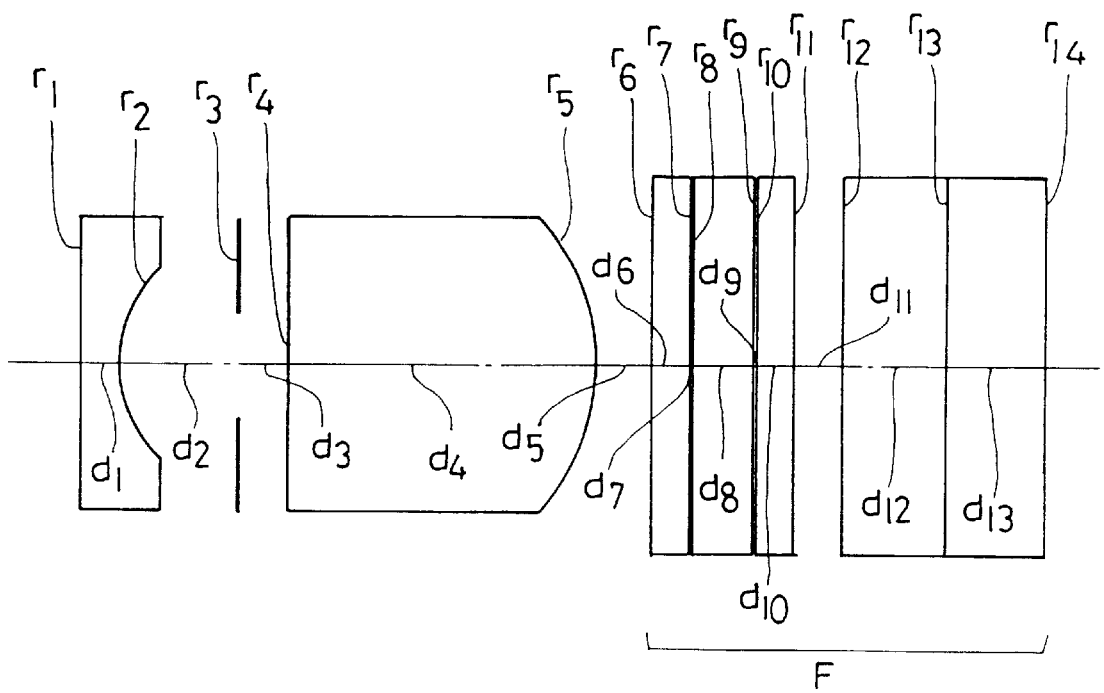

Preferred as an eleventh embodiment of the present invention is an objective lens system which has a composition illustrated in FIG. 14. This lens system comprises two lens units, or is composed, in order from the object side, a first lens unit composed of a negative lens element, a stop, a second lens unit composed of a positive lens element and filters F disposed on the image side of the second positive lens unit. The first lens unit is configured as a homogenous lens element which has a planar surface on the object side and a concave surface on the image side, whereas the second lens unit is configured as a biconcave radial type gradient index lens element which has an object side surface having a weak positive refractive power.

When the objective lens system according to the present invention is used in a video scope or the like which uses a solid-state image pickup device such as a CCD, a low pass filter and an infrared cut filter composed, for example, of quartz or diffraction gratings may be disposed on the object side of an image surface as exemplified in FIG. 14. The eleventh embodiment is an example comprising such filters. In the objective lens system according to the present invention, the above-mentioned filters can be disposed between the negative lens element and the positive lens element.

Figure 15:
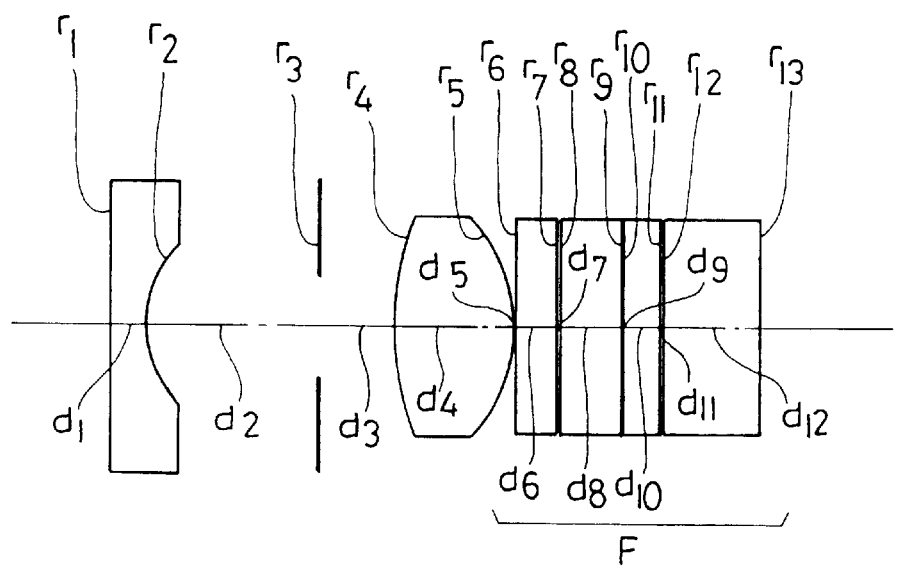

Preferred as the twelfth embodiment of the present invention is an objective lens system which has a composition shown in FIG. 15. Like the eleventh embodiment, the twelfth embodiment comprises two lens units, or is composed, in order from the object side, of a first lens unit composed of a negative lens element, a stop, a second lens unit composed of a positive lens element, and filters which are disposed between the two lens elements and on the image side of the positive lens element. The first lens unit is configured as a homogenous lens element which has a planar surface on the object side and a concave surface on the image side, whereas the second lens unit is configured as a radial type gradient index lens element which has a biconvex shape.

Figure 16A:
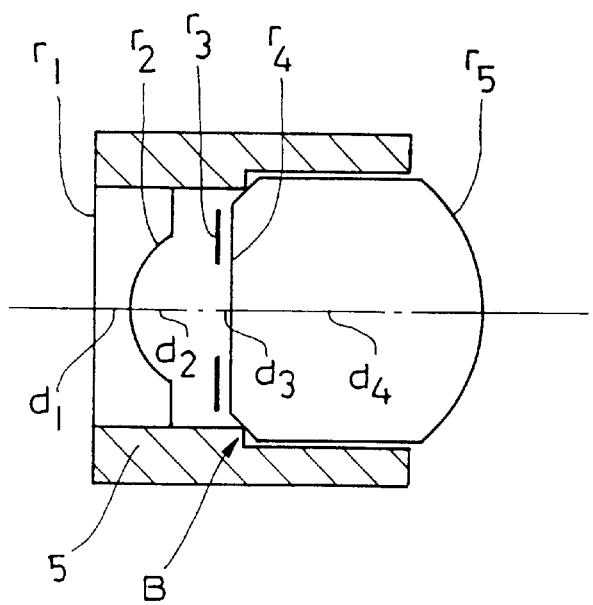
FIGS. 16A and 16B show views illustrating a composition of a thirteenth embodiment of the objective lens system according to the present invention.
Figure 16B:
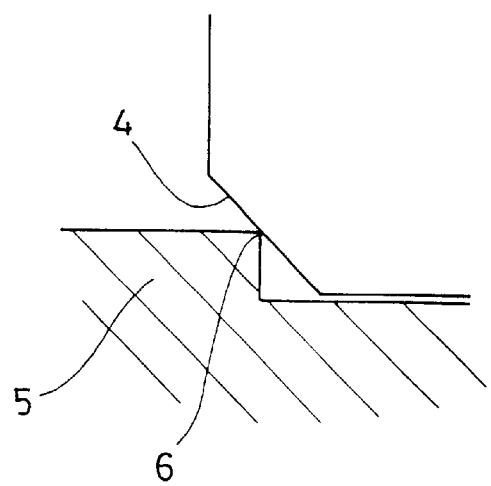

The thirteenth embodiment of the present invention has a composition illustrated in FIGS. 16A and 16B: FIG. 16A being a sectional view showing the thirteenth embodiment as a whole and FIG. 16B being a diagram illustrating only a portion B on an enlarged scale. The thirteenth embodiment is composed, in order from the object side, of a first lens unit composed of a negative lens element, a stop and a second lens unit composed of a positive lens element. A radial type gradient index lens element is used as the second lens unit. The first lens unit has a planar surface on the object side and a concave surface on the image side, whereas the second lens unit has a planar surface on the object side and a convex surface on the image side.

The thirteenth embodiment is an example wherein aberrations are favorably corrected by using a radial type gradient index lens element and a large number of planar surfaces are adopted for reducing a cost required for polishing lens elements, or the object side surface of the first lens unit and the object side surface of the second lens unit are configured to be planar.

Further, for preventing eccentricities of lens elements, in directions along an optical axis and perpendicular thereto in particular, which pose a problem at a stage of assembly, an outer circumferential portion 4 is obliquely chamfered as shown in FIG. 16B so that a chamfered portion 4 is limited at a location 6 of a lens barrel 5. Since a radial type gradient index lens element which has a refractive power of medium requires a manufacturing precision stricter than that for a homogenous lens element, the thirteenth embodiment provides effective assembling convenience. A similar effect can, needless to say, be obtained by assembling the first lens unit having the negative refractive power in a similar manner.

Though the thirteenth embodiment uses a large number of planar surfaces, it has high optical performance.

Figure 17:
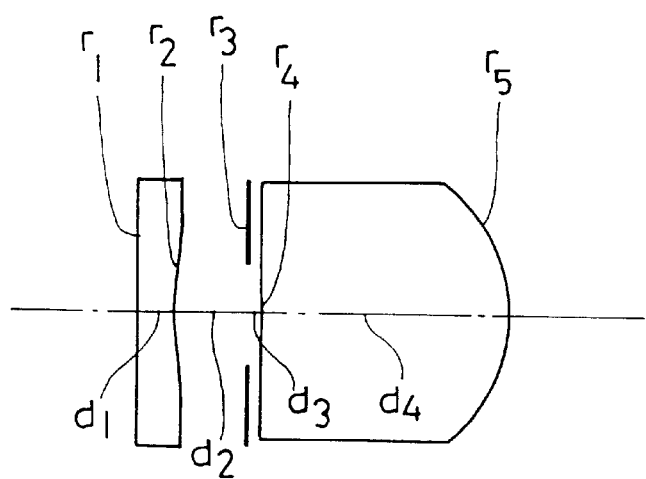
FIGS. 17 through 21 show sectional views illustrating composition of fourteenth through eighteenth embodiments of the objective lens system according to the present invention.

The fourteenth embodiment of the present invention is an objective lens system which has a composition illustrated in FIG. 17. That is to say, the fourteenth embodiment is composed, in order from the object side, of a first lens unit consisting of a negative lens element, a stop and a second lens unit consisting of a positive lens element which is configured as a radial type gradient index lens element. The first lens unit has a planar surface on the object side and a concave surface on the image side, whereas the second lens unit has a meniscus shape which has a concave surface on the object side.

When a radial type gradient index lens element is used as the second lens unit, it is desirable for correcting aberrations such as spherical aberration that the term of the fourth order $N_{20}$ of a refractive index distribution has a positive value.

Figure 18:
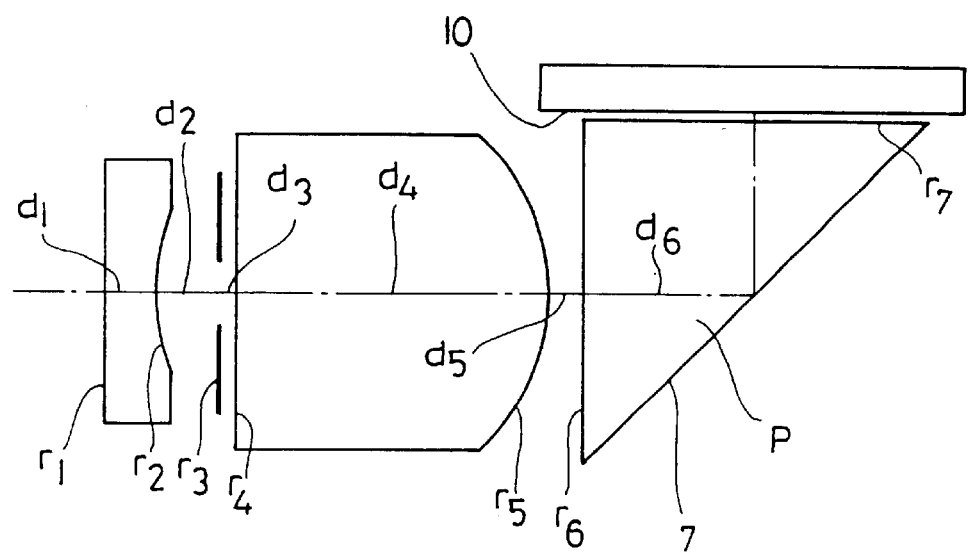

The fifteenth embodiment of the present invention has a composition shown in FIG. 18. Speaking concretely, the fifteenth embodiment is composed, in order from the object side, of a first lens unit consisting of a negative lens element, a second lens unit consisting of a positive lens element and a reflecting optical element. A radial type gradient index lens element is used as the second lens unit. In this embodiment, a light bundle emerging from the second lens unit is reflected by a reflecting surface 7 of a reflecting optical element P made, for example, of a mirror or a prism so that it is imaged onto a solid-state image pickup device 10 which is disposed nearly parallel to the optical axis. This reflecting surface makes it possible to dispose a solid-state image pickup device such as a CCD that is not parallel to a radial direction of the lens elements, but oblique. Though a solid-state image pickup device 10 is disposed nearly parallel to the optical axis in the fifteenth embodiment, the image pickup device can be disposed more obliquely by selecting an adequate inclination angle for the reflecting surface 7 relative to the optical axis. Though the fifteenth embodiment is configured to reflect the light bundle only once, it is possible to reflect the light bundle twice, three times or more times by adopting a larger number of reflecting surfaces.

Figure 19:
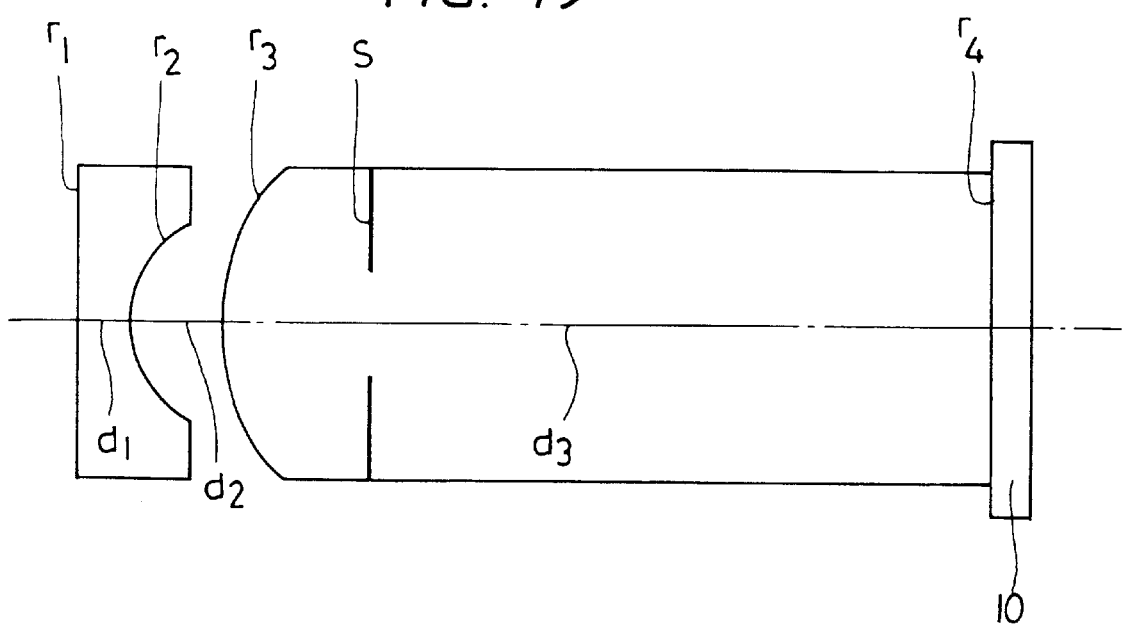
Figure 25:
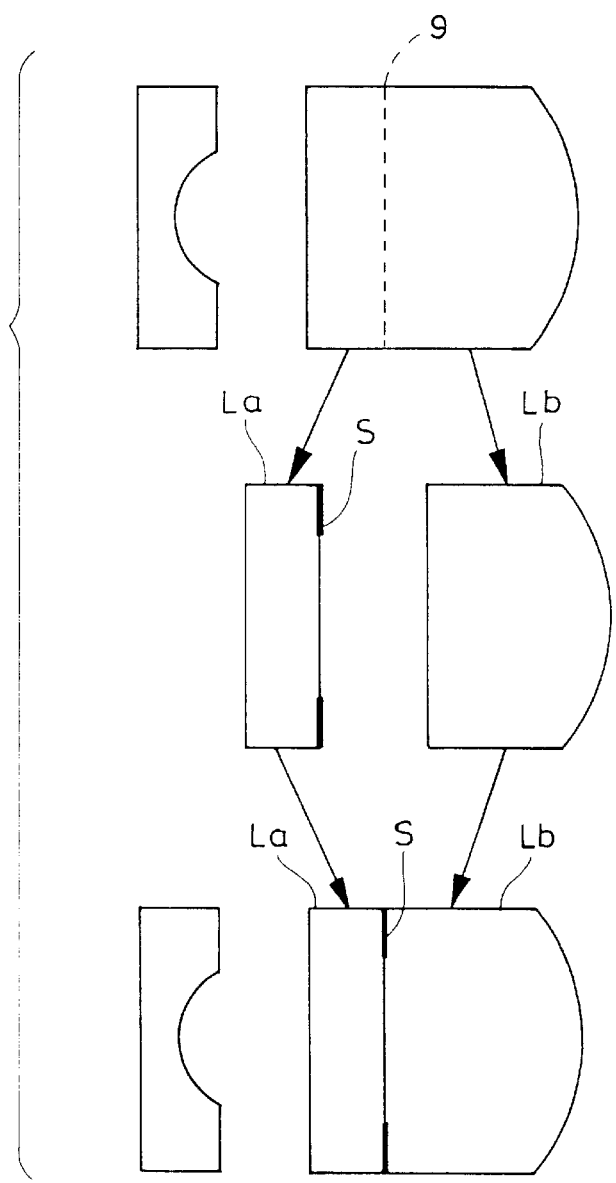
FIG. 25 is a diagram showing another example of a stop which is to be disposed in the objective lens system according to the present invention.

The sixteenth embodiment of the present invention is an objective lens system which has a composition shown in FIG. 19. That is to say, the sixteenth embodiment is composed, in order from the object side, of a first lens unit composed of a negative lens element, a second lens unit composed of a positive lens element and a solid-state image pickup device. A radial type gradient index lens element is used ass the second lens unit. In this embodiment, the radial type gradient index lens element has a nearly planar image side surface which is cemented or kept in close contact to or with a solid-state image pickup device 10 such as a CCD. Further, disposed in the second lens unit, is a member which extends from an outer circumference toward an optical axis for shielding a light bundle passing through the lens unit or functioning as an aperture stop of the objective lens system. Such a shielding member can be constituted, for example, by forming a cut 8 from the outer circumference toward the optical axis. For preventing the cut from producing flare, it is desirable to color the cut 8. Further, it is possible to cut the second lens unit along a dashed line 9 shown in FIG. 25 into a front portion La and a rear portion Lb, attach a stop S to a cut surface of the front portion La and cementing the two portions to each other or bringing them into close contact with each other. A similar effect can be obtained by attaching the stop S to the rear portion Lb in place of the front portion La. As means for attaching the stop, it is conceivable to utilize deposition, printing or bonding a stop plate. This means can be utilized for manufacturing not only an aperture stop but also a flare stop.

In the sixteenth embodiment, the aperture stop is disposed at a location 1 mm apart from an object side surface of the second lens unit toward an image surface.

It is needless to say that an aperture stop, a flare stop or the like can be manufactured by the means described above in each of the embodiments.

Figure 20:
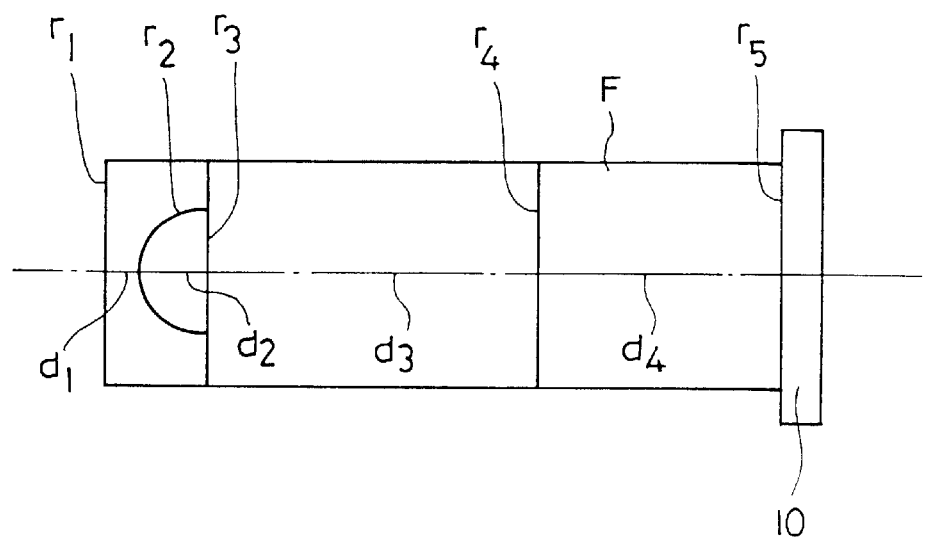

The seventeenth embodiment of the present invention has a composition illustrated in FIG. 20. That is to say, the seventeenth embodiment is composed, in order from the object side, of a first lens unit composed of a negative lens element, a second lens unit composed of a positive lens element, an optical filter F and a solid-state image pickup device 10. A radial type gradient index lens element is used as the second lens unit. In the seventeenth embodiment, the second lens unit has planar surfaces on both sides for reducing the cost for polishing the lens unit. The seventeenth embodiment is an example wherein the second lens unit is cemented to the optical filter F for simplifying a structure of a lens barrel and assembly of the objective lens system. Further, the optical filter F is cemented or kept in close contact to or with the solidstate image pickup device 10. Furthermore, the first lens unit and the second lens unit are cemented or kept in close contact to or with each other on outer circumferences thereof outside an effective diameter thereof.

In the seventeenth embodiment, an aperture stop is disposed at a location 1 mm apart from an object side surface of the second lens unit toward an image surface.

Figure 21:
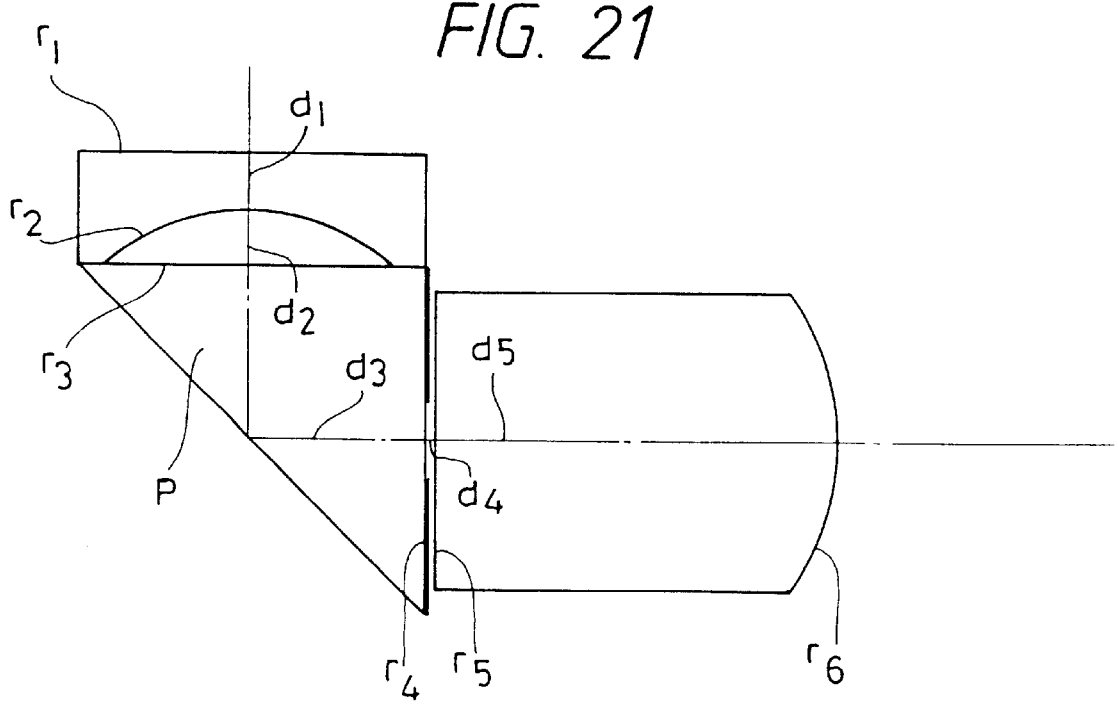

The eighteenth embodiment of the present invention has a composition shown in FIG. 21. That is to say, the eighteenth embodiment is composed, in order from the object side, of a first lens unit composed of a negative lens element, a regularly reflecting optical element and a second lens unit composed of a positive lens element. The second lens unit which is disposed on the image side is configured as a radial type gradient index lens element.

Certain endoscopes are specified for oblique observation in direction inclined relative to the optical axis. When the objective lens system according to the present invention is used in an endoscope for oblique observation, a reflecting optical element P composed of a mirror or a prism is disposed between the first lens unit and the second lens unit as shown in FIG. 21 so that a light bundle emerging from the first lens unit is reflecting by a reflecting surface 7 of the reflecting optical element and led to the second lens unit.

Figure 22A:
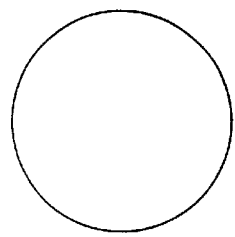
FIGS. 22A, 22B and 22C show diagrams exemplifying a shape, before working, of a lens element which is to be used in the objective lens system according to the present invention.
Figure 22B:
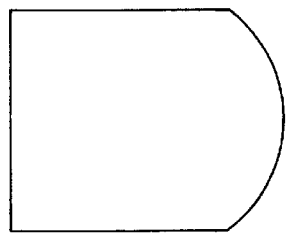
Figure 22C:
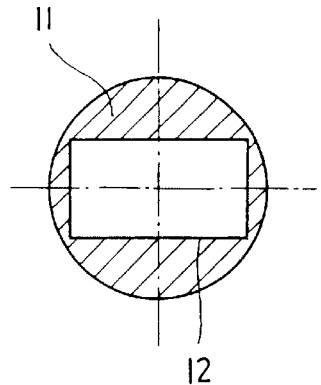
Figure 23A:
FIGS. 23A, 23B and 23C show diagrams exemplifying a shape, after working, of the lens system which is to be used in the objective lens system according to the present invention.
Figure 23B:
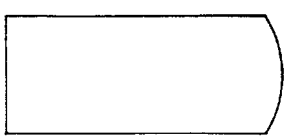
Figure 23C:
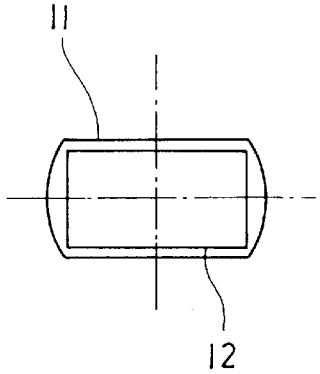
Figure 24:
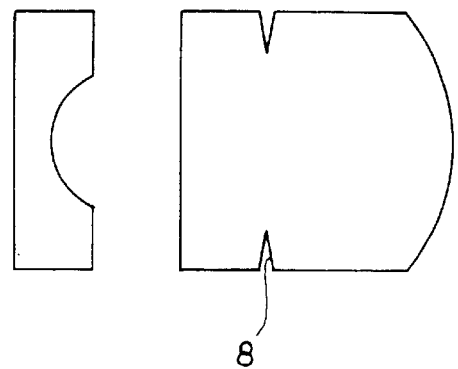
FIG. 24 is a diagram showing an example of a stop which is to be disposed in the objective lens system according to the present invention.

Though a lens element ordinarily has a circular sectional shape, it may have a different sectional shape. FIGS. 22A, 22B, 22C, 23A, 23B and 23C exemplify lens elements which have external shapes cut or worked in accordance with shapes of image pickup devices for configuring objective lens systems compactly. FIGS. 22A, 22B and 22C schematically show the second lens unit which is used in the first through eighteenth embodiments before being shaped. FIG. 22A shows a sectional view taken in a direction from an object, FIG. 22B is a sectional view taken in a direction in parallel with the optical axis, and FIG. 22C illustrates an image circle 11 of the objective lens system and an image pickup surface 12 of an image pickup device. FIGS. 23A, 23B and 23C schematically show the lens element illustrated in FIGS. 22A, 22B and 22C in another condition after it is shaped. Since a solid-state image pickup device such as CCD may have a rectangular shape and a lens element ordinarily has a circular shape as shown in FIG. 22A, there is produced, as slashed in FIG. 22C, a region which serves for image formation but is not used for image pickup. Since it is desired to configure an objective lens system for endoscopes compacter, it is conceivable to cut off the region of the lens element which is not used for image pickup. The eighteenth embodiment is an example wherein lens portion through which rays to be condensed outside an image pickup surface of an image pickup device are cut off as exemplified by FIGS. 23A and 23B so that an image formation range of the lens element is nearly coincident with the image pickup surface of the image pickup device. It is possible to obtain a compacter objective lens system or endoscopes by configuring a lens element so as to occupy a narrower space.

Though the second lens unit is worked for narrowing a lens space in the example descried above, it is needless to say that a similar effect can be obtained by working other lens element or optical element, for example, the first lens unit or the reflecting optical element.

Figure 26:
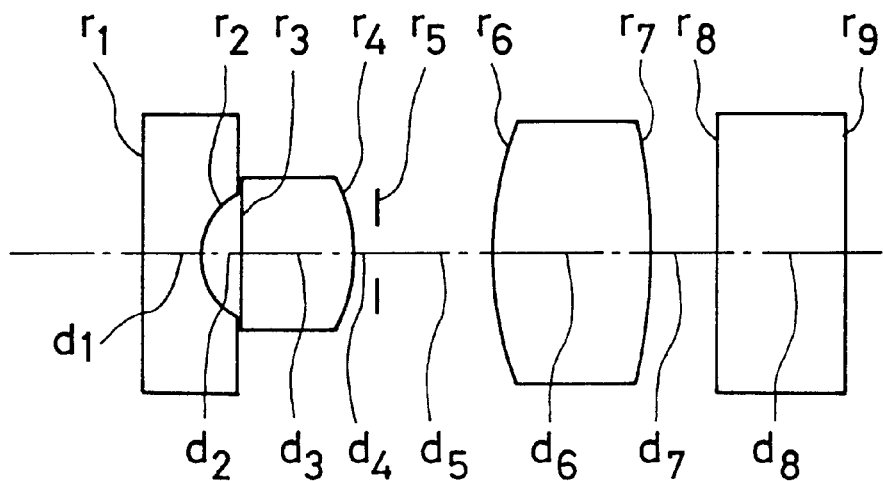
FIGS. 26 through 31 show sectional views illustrating compositions of nineteenth through twenty-fourth embodiments of the objective lens system according to the present invention.
Figure 27:
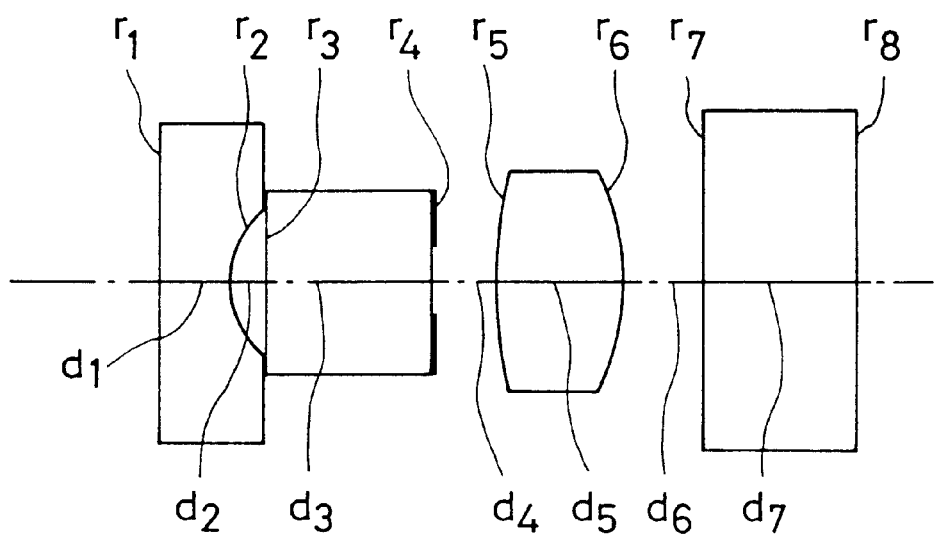

The nineteenth embodiment has a composition illustrated in FIG. 26. Speaking concretely, the nineteenth embodiment is a retrofocus type objective lens system which is composed, in order from the object side, of a first negative lens unit, a second positive lens unit and a third positive lens unit. A stop is disposed between the second lens unit and the third lens unit. The nineteenth embodiment is an objective lens system which has a wide field angle and is usable for endoscopes, video cameras, etc. Though the nineteenth embodiment has a wide field angle which makes it rather hard to contact lateral chromatic aberration, it corrects lateral chromatic aberration with a radial type gradient index lens element. In the nineteenth embodiment, the first lens unit has a plano-concave shape and a function to widen a field angle, the second lens unit has a plano-convex shape and a function to correct mainly lateral chromatic aberration produced by the first lens unit, and the third lens unit has a biconvex shape and a main imaging function, and is configured as a radial type gradient index lens element.

Though it is rather hard in the nineteenth embodiment to correct coma which is produced by the third lens unit disposed on the image side of a stop, coma is corrected by configuring the third lens unit as a radial type gradient index lens element which has such a characteristic as to progressively lower a refractive index in a radial direction from an optical axis. In other words, coma is corrected by imparting a positive refractive power to a medium of the radial type gradient index lens element. The composition described above is capable of correcting not only coma but also distortion.

For correcting coma with a medium of a radial type gradient index lens element, it is desirable that terms of high orders of a refractive index distribution satisfy the following condition (27):

$$-0.05 < \sum_{i=2}^{n} N_{i od} e^{2i} < 0.2 \tag{27}$$

wherein the reference symbol e represents an effective diameter of the lens element.

If the lower limit of −0.05 of the condition (27) is not reached, coma will be undercorrected. If the upper limit of 0.2 of the condition (27) is exceeded, in contrast, coma will be overcorrected.

It is desirable for more favorable correction of coma to satisfy the following condition (28):

$$0 < \sum_{i=2}^{n} N_{iod} e^{2i} < 0.1 \tag{28}$$

If the lower limit of 0 of the condition (28) is not reached, coma will be undercorrected. If the upper limit of 0.1 of the condition (28) is exceeded, in contrast, coma will be overcorrected. Either of these cases is undesirable for more favorable correction of coma.

Further, a planar surface used as an object side surface of the lens element disposed on the image side in the nineteenth embodiment has an effect for preventing adhesion of foreign matter such as dust.

In this embodiment, at least one lens element can have a function to cut off components having specific wavelengths, or a radial type gradient index lens element can have such a function.

When an image pickup device such as a CCD which has high sensitivity in the infrared wavelength region is to be disposed on an image pickup surface, for example, it is desirable to provide a function to cut off components having wavelengths in the infrared region. Accordingly, it is desirable that at least one lens element has a function to cut off components having specific wavelenghts such as those in the infrared region.

The function to cut off components having specific wavelengths can be obtained by forming, on a flat portion of a lens element or a flat plate, an interference film which cuts off the components having specific wavelengths.

A stop can be manufactured from a thin plate.

Further, amounts of aberrations produced can be reduced by configuring a radial type gradient index lens element so as to have a biconvex shape, thereby sharing a refractive power between the two surfaces.

Use of a radial type gradient index lens element makes it possible to obtain an optical system which is compact and composed of a small number of lens elements, and has a wide field angle and favorably corrected aberrations such as chromatic aberration and coma. Accordingly, it is effective to use an optical system such as an optical system for image input units for portable TV telephones and portable data input units such as those shown in FIGS. 35 and 36.

The twentieth embodiment is an optical system which has a composition illustrated in FIG. 17. It is a retrofocus type optical system which is composed, in order from the object side, of a first lens unit having a negative refractive power, a second lens unit having a positive refractive power and a third lens unit having a positive refractive power. A stop is disposed between the second lens unit and the third lens unit.

The twentieth embodiment is an optical system which has a wide field angle and is usable as an objective lens system for endoscopes or a lens system for video cameras, etc. Though the twentieth embodiment also has a wide field angle and hardly allows correction of lateral chromatic aberration in particular, aberrations are favorably corrected in this embodiment by using a radial type gradient index lens element.

In the twentieth embodiment, the first lens unit is a plano-concave lens element having a function to widen a field angle, the second lens unit is a radial type gradient index lens element having planar surfaces on both sides and a function to correct lateral chromatic aberration produced by the first lens unit, and the third lens unit has a biconvex shape and a main imaging function. The twentieth embodiment favorably corrects lateral chromatic aberration in particular by using, as the second lens unit disposed on the object side of the stop, a radial type gradient index lens element made of a medium which has a positive refractive power and a relatively strong dispersing power. The medium having the positive refractive power favorably corrects a Petzval's sum.

For correcting lateral chromatic aberration by disposing a radial type gradient index lens element on a stop, it is desirable to satisfy the following condition (29).

$$0.01 < 1 V_{10} < 0.5 \tag{29}$$

If the lower limit of 0.01 of the condition (29) is not reached, lateral chromatic aberration will be undercorrected. If the upper limit of 0.5 of the condition (29) is exceeded, in contrast, lateral chromatic aberration will be overcorrected.

For correcting lateral chromatic aberration more favorably by disposing a radial type gradient index lens element on the object side of the stop, it is desirable to satisfy the following condition (30):

$$0.015 < 1/V_{10} < 0.1 \tag{30}$$

If the lower limit of 0.015 of the condition (30) is not reached, lateral chromatic aberration will be undercorrected. If the upper limit of 0.1 of the condition (30) is exceeded, lateral chromatic aberration will be overcorrected. Either of these cases is undesirable for correcting lateral chromatic aberration extremely favorably.

When preparation of a material for a radial type gradient index lens element is taken into consideration, it is desirable that $1/V_{10}$ has a value not exceeding 0.05. From viewpoints of manufacturing convenience and cost, it is desirable to configure a radial type gradient index lens element so as to have planar surfaces on both sides. When durability of a radial type gradient index lens element is taken into consideration, it is desirable to make it entirely of a glass material.

Figure 28:
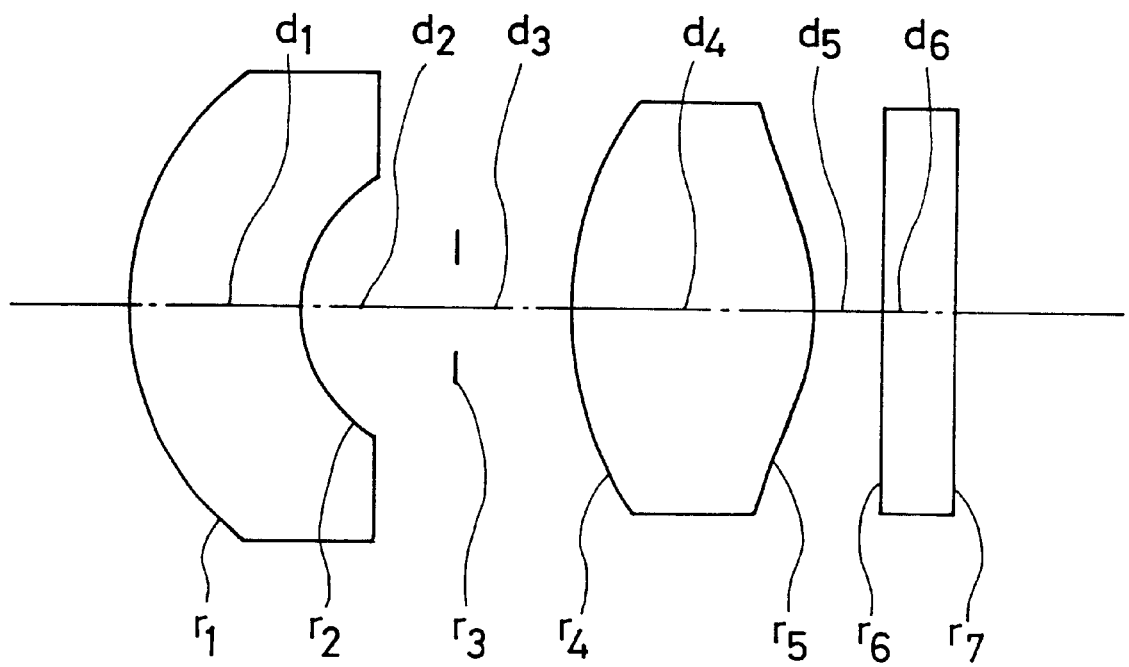

The twenty-first embodiment has a composition illustrated in FIG. 28, or is a retrofocus type optical system which is composed, in order from the object side, of a first lens unit having a negative refractive power and a second lens unit having a positive refractive power. A stop is disposed between the first lens unit and the second lens unit. The twenty-first embodiment which is an optical system having a wide field angle is usable as an objective lens system for endoscopes or video cameras and so on. Though this optical system also has a wide field angle and hardly allows correction of lateral chromatic aberration in particular, lateral chromatic aberration is favorably corrected by using a radial type gradient index lens element.

In the optical system preferred as the twenty-first embodiment, the first lens unit has a negative meniscus shape which has a concave surface on the image side, and the second lens unit has a biconvex shape and a main imaging function. A radial type gradient index lens element is used as the first lens unit.

Offaxial aberrations can be corrected favorably by configuring the radial type gradient index lens element used as the first lens unit so as to have the meniscus shape which has the concave surface on the side of the stop. Lateral chromatic aberration is favorably corrected in particular owing to a fact that the radial type gradient index lens element has a positive refractive power of medium and is configured so as to satisfy the condition (29).

Further, coma is corrected favorably by using an aspherical surface on the lens element disposed on the object side of the stop. This aspherical surface has such a shape as to weaken a positive refractive power as portions of the aspherical surface are farther from an optical axis toward a marginal portion. Owing to this aspherical surface, the twenty-first embodiment is configured as an optical system which is compact and composed of a small number of lens elements, has a wide field angle and favorably corrects aberrations such as coma. It is therefore effective to apply the twenty-first embodiment as an optical system for image intake devices for portable TV telephones and portable date input units.

Figure 29:
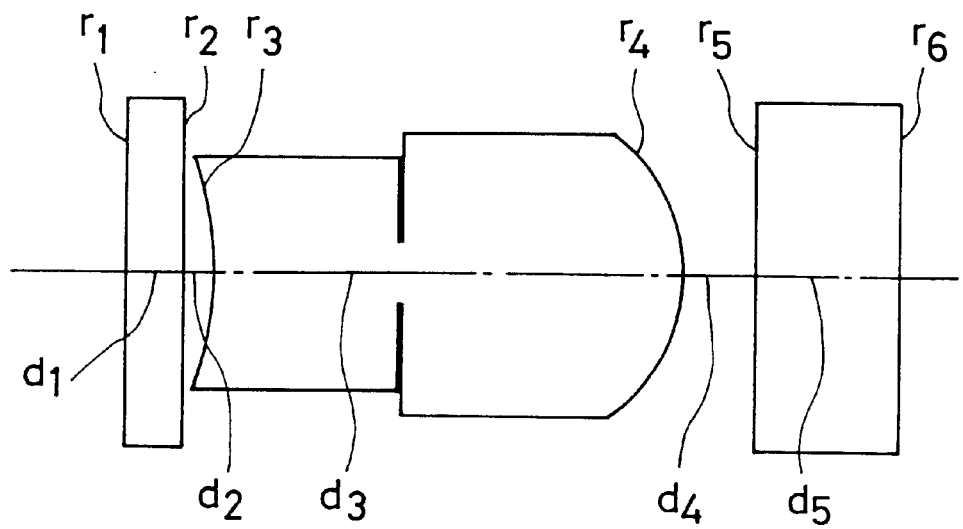

The twenty-second embodiment has a composition shown in FIG. 29, or is an optical system composed of a single radial type gradient index lens element. The radial type gradient index lens element has a meniscus shape which has a concave surface on the object side and a positive power of medium. A stop is disposed at a location 0.9471 mm apart from an object side surface of the lens element toward the image side.

The twenty-second embodiment has a wide field angle, and is usable as an objective lens system for endoscopes or a lens system for video camera and so on. Though the twenty-second embodiment which has a wide field angle hardly allows correction of chromatic aberration, it is corrected with the radial type gradient index element. A flat glass plate is disposed on the object side as a cover glass plate. A stop is disposed in the radial type gradient index lens element for obtaining highly symmetrical refractive power of medium, thereby favorably correcting offaxial aberrations. The radial type gradient index lens element satisfies the condition (29) for correcting lateral chromatic aberration produced by an object side concave or convex surface with a medium located on the object side of the stop.

For reducing chromatic aberration to be produced by surfaces of the radial type gradient index lens element, it is desirable that $V_{00}$ has a value of at least 30, or more desirably, at least 40. For reducing aberrations to be produced by the surfaces of the radial type gradient index lens element, it is desirable that $N_{00}$ has a value of at least 1.55, or more desirably, at least 1.6.

Figure 30:
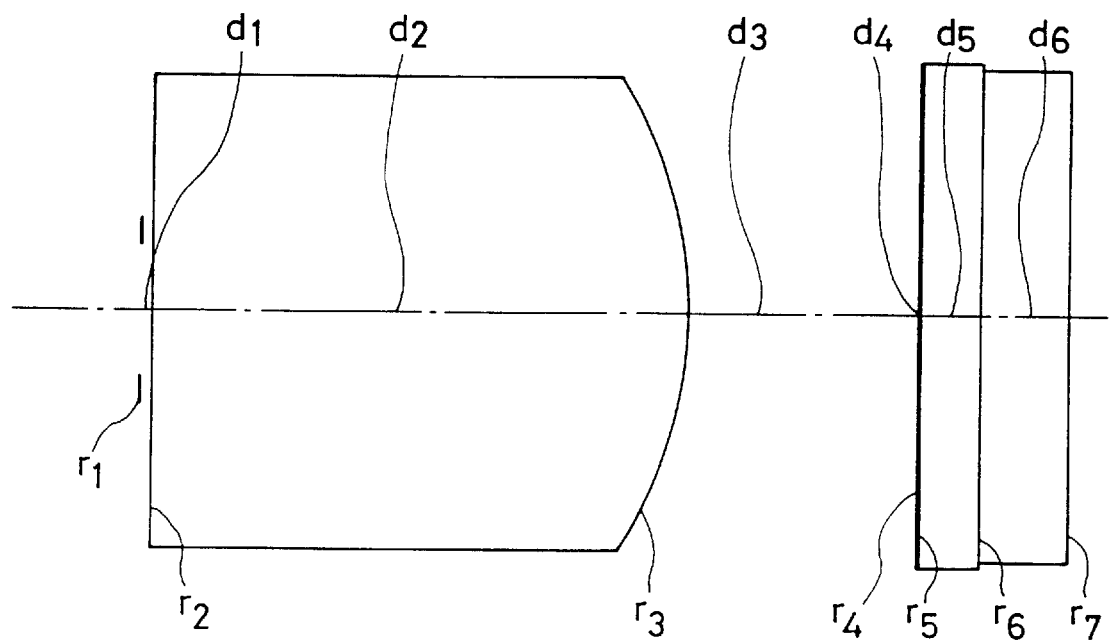

The twenty-third embodiment has a composition shown in FIG. 30, or is composed of two lens units, in order from the object side, a first positive lens unit and a second positive lens unit. The twenty-third embodiment is an example wherein aberrations are corrected favorably by composing an optical system of a radial type gradient index element and a diffraction type optical element (DOE). Speaking more concretely, the twenty-third embodiment is composed, in order from the object side, of a first lens unit composed of a radial type gradient index lens element and a second lens unit composed of a diffraction type optical element.

A diffraction type optical element is equivalent to a lens element which has a very high imaginary refractive index as described in literature SPIE, Vol. 126, P46 (1997). For this reason, the diffractive optical element is assumed to be a lens element which is optically equivalent to the optical element including aberrations to be produced thereby, and radii of curvature, thickness, a refractive index, an Abbe's number and aspherical surface coefficients of the lens element are described in the numerical data of the twenty-third embodiment. In the twenty-third embodiment, a stop is disposed on the object side of the optical system (the first lens unit).

In the twenty-third embodiment, the first lens unit composed of the radial type gradient index lens element has a main imaging function and the second lens unit composed of the diffraction type optical element favorably corrects lateral chromatic aberration. The twenty-third embodiment is an example of an optical system which is composed of a small number of optical elements and has a wide field angle, and favorably corrects lateral chromatic aberration with a diffractive optical element disposed on the image side of a stop. The diffraction type optical element has a positive refractive power, is disposed on the image side of the radial type gradient index lens element and has a function to favorably correct lateral chromatic aberration produced by a convex surface of the radial type gradient index lens element. Further, the radial type gradient index lens element has another function to favorably correct a Petzval's sum.

The twenty-third embodiment is usable as described above, as an objective lens system for endoscopes or an optical system for video cameras and so on. Since the twenty-third embodiment is an optical system which is compact and is composed of a small number of lens elements, and favorably corrects aberrations such as chromatic aberration owing to the fact that it uses the diffraction type optical element, it is effective to apply it as an optical system for image intake devices for portable TV telephones and portable data input units.

Figure 31:
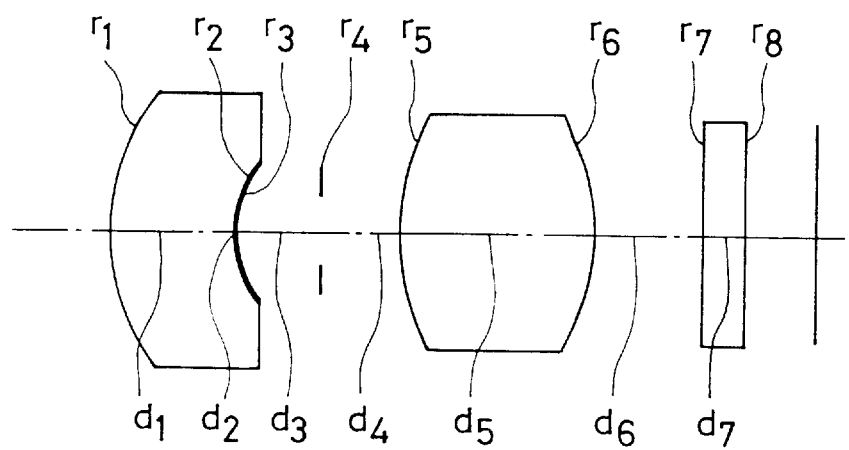

The twenty-fourth embodiment has a composition illustrated in FIG. 31, or is composed, in order from the object side, of a first lens unit having a negative refractive power and a second lens unit having a positive refractive power. A stop is disposed between the first lens unit and the second lens unit. In the twenty-fourth embodiment, the first lens unit having the negative refractive power serves mainly for widening a field angle and the second lens unit having the positive refractive power functions mainly for imaging.

The twenty-fourth embodiment favorably corrects aberrations by using the diffraction type optical element in that place of the radial type gradient index lens element adopted for the twenty-first embodiment.

The twenty-fourth embodiment hardly allows correction of offaxial aberrations since it has an asymmetrical refractive power distribution wherein a negative refractive power is disposed on the object side of the stop and a positive refractive power is disposed on the image side of the stop. For this reason, lateral chromatic aberration is corrected favorably by disposing the diffraction type optical element on the object side of the stop an imparting a negative refractive power to this optical element. Coma and distortion in particular can be corrected favorably by using an aspherical surface on a positive lens unit disposed on the image side of the stop and configuring this aspherical surface so as to have such a shape as to weaken a positive refractive power in a radial direction from an optical axis. The negative lens unit has a meniscus shape which has a concave surface on the side of the stop for reducing amounts of offaxial aberrations in particular. Further, the positive lens unit has a biconvex shape so that amounts of aberrations are reduced by sharing a refractive power between two surfaces. Furthermore, the diffraction type optical element is disposed on a surface which is concave toward the stop so that differences between angles of incidence of paraxial rays and offaxial rays are reduced, thereby enhancing a diffraction efficiency.

Figure 32:
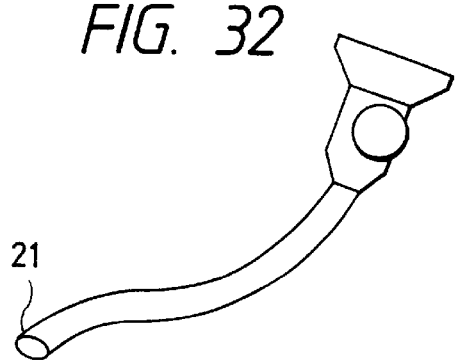
FIG. 32 shows a perspective view illustrating an endoscope which uses the objective lens system according to the present invention.

FIG. 32 is a perspective view illustrating an endoscope according to the present invention which uses an objective lens system such as the embodiment described above. The reference numeral 21 represents the objective lens system.

Figure 33:
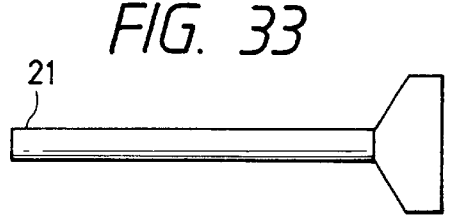
FIG. 33 shows a side view of a non-flexible endoscope which uses the objective lens system according to the present invention.

FIG. 33 is a side view of a non-flexible endoscope according to the present invention which uses an objective lens system such as the embodiment described above. The reference numeral 21 represents the objective lens system.

Figure 34:
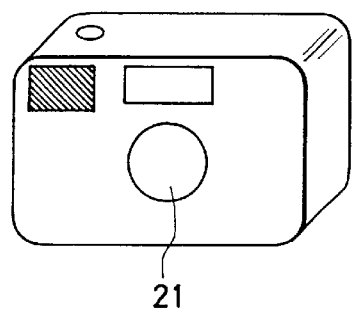
FIG. 34 shows a perspective view illustrating a video camera which uses the objective lens system according to the present invention.

FIG. 34 shows a video camera according to the present invention which uses an objective lens system such as the embodiment described above. The reference numeral 21 represents the objective lens system.

Figure 35:
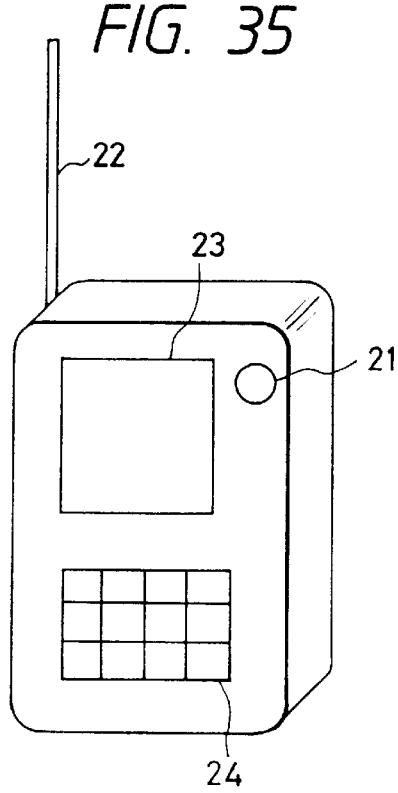
FIG. 35 shows a perspective view illustrating a portable TV telephone which uses the objective lens system according to the present invention.

FIG. 35 shows a perspective view illustrating a portable TV telephone according to the present invention which uses an objective lens system such as the embodiment described above. The reference numeral 21 represents the objective lens system, the reference numeral 22 designates an antenna for transmission and reception, the reference numeral 23 denotes a display, and the reference numeral 24 represents switches.

Figure 36:
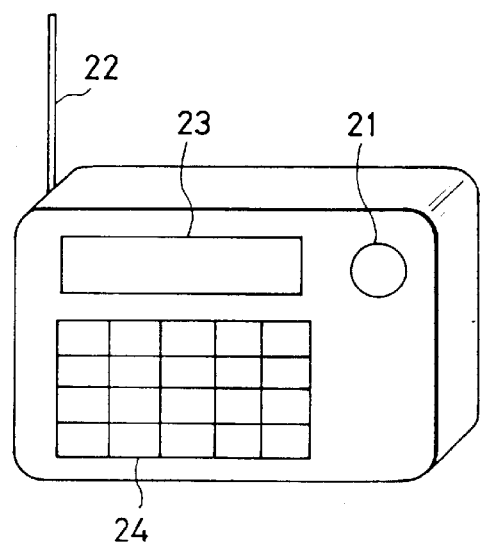
FIG. 36 shows a perspective view illustrating a portable data input unit which uses the objective lens system according to the present invention.

Further, FIG. 36 shows a perspective view illustrating a portable data input unit according to the present invention which uses an objective lens system such as the embodiment described above. The reference numeral 21 represents the objective lens system, the reference numeral 22 22 designates an antenna for transmission and reception, the reference numeral 23 denotes a display, and the reference numeral 24 represents switches.

As understood from the foregoing description, the objective lens system for endoscopes according to the present invention is composed of lens elements in a number on the order of 2, and is nevertheless an optical system which favorably corrects aberrations, lateral chromatic aberration in particular, and has high optical performance.

What is claimed is:

1. A portable TV telephone, comprising:
   an objective lens constructed and arranged to form an image of an object;
   an antenna constructed and arranged to transmit and receive at least one of an image signal representing said image of the object, a dial signal and a voice signal carried by radio waves;
   a display unit which displays at least a dial number and said image of the object; and
   a switch which operates responsive to at least the dial number,
   wherein said objective lens system includes a diffractive optical element configured to at least correct chromatic aberration produced by said objective lens system,
   wherein said objective lens system has a stop,
   wherein said diffractive optical element has a negative refractive power and
   wherein said diffractive optical element is disposed on an object side of said stop.

2. A portable TV telephone comprising:
   an objective lens system arranged to form an image of an object;
   an antenna constructed and arranged to transmit and receive at least one of an image signal representing said image of the object, a dial signal and a voice signal carried by radio waves;
   a display unit constructed and arranged to display at least a dial number and said image of the object; and
   a switch constructed and arranged to operate responsive to at least the dial number,
   wherein said objective lens system includes a diffractive optical element configured to at least correct chromatic aberration produced by said objective lens system,
   wherein said objective lens system comprises, in order from an object side, a first negative lens unit and a second positive lens unit, and wherein said first lens unit consists only of a negative lens element and said second lens unit consists only of a positive lens element.

3. A portable TV telephone comprising:
   an objective lens system arranged to form an image of an object;
   an antenna constructed and arranged to transmit and receive at least one of an image signal representing said image of the object, a dial signal and a voice signal carried by radio waves;
   a display unit constructed and arranged to display at least a dial number and said image of the object; and
   a switch constructed and arranged to operate responsive to at least the dial number,
   wherein said objective lens system includes a diffractive optical element configured to at least correct chromatic aberration produced by said objective lens system,
   wherein said objective lens system comprises, in order from an object side, a first negative lens unit and a second positive lens unit, and wherein said diffractive optical element is cemented to a surface of said first negative lens unit.

4. A portable TV telephone comprising:
   an objective lens system arranged to form an image of an object;
   an antenna constructed and arranged to transmit and receive at least one of an image signal representing said image of the object, a dial signal and a voice signal carried by radio waves;
   a display unit constructed and arranged to display at least a dial number and said image of the object; and
   a switch constructed and arranged to operate responsive to at least the dial number,
   wherein said objective lens system includes a diffractive optical element configured to at least correct chromatic aberration produced by said objective lens system,
   wherein said objective lens system comprises, in order from an object side, a first negative lens unit and a second positive lens unit, wherein said objective optical system comprises a stop which is disposed between said first negative lens unit and said second positive lens unit, and wherein said diffractive optical element is disposed on the object side of said stop.

5. The portable TV telephone according to claim 1, 2, 3 or 4, wherein said objective lens system is disposed on a surface on which said image display unit is disposed.

6. The portable TV telephone according to claim 1, 2, 3 or 4, wherein said objective lens system is disposed on a surface on which said switch is disposed.

* * * * *